(12) United States Patent
Nakamura et al.

(10) Patent No.: US 7,588,485 B1
(45) Date of Patent: Sep. 15, 2009

(54) METHOD AND APPARATUS FOR TRANSFERRING A STICK FOR SUSPENDING LOOPS OF SAUSAGES

(75) Inventors: Tatsuo Nakamura, Yokohama (JP); Minoru Kasai, Yokohama (JP); Takayuki Fujimaki, Yokohama (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 12/108,558

(22) Filed: Apr. 24, 2008

(51) Int. Cl.
*A22C 11/00* (2006.01)

(52) U.S. Cl. ....................................................... 452/51

(58) Field of Classification Search ............. 452/30–32, 452/35–37, 46–51, 177, 179–184; 99/352, 99/355, 443 C, 443 R, 483, 494
See application file for complete search history.

(56) References Cited

U.S. PATENT DOCUMENTS

| | | | |
|---|---|---|---|
| 6,869,353 B2 | 3/2005 | Kasai | |
| 7,166,021 B2 * | 1/2007 | Stimpfl | 452/32 |
| 7,249,997 B2 | 7/2007 | Kasai | |
| 7,255,638 B2 * | 8/2007 | Stimpfl | 452/32 |
| 7,354,338 B2 * | 4/2008 | Nakamura et al. | 452/30 |

| | | |
|---|---|---|
| 2003/0096568 A1 | 5/2003 | Kasai |

FOREIGN PATENT DOCUMENTS

| | | |
|---|---|---|
| DE | 10046417 | 3/2002 |
| JP | 2003-158991 | 6/2003 |
| JP | 2003180239 | 7/2003 |
| JP | 2006-197935 | 8/2006 |

* cited by examiner

*Primary Examiner*—Thomas Price
(74) *Attorney, Agent, or Firm*—Bachman & LaPointe, P.C.

(57) ABSTRACT

An apparatus 1 for transferring a stick for suspending loops of sausages, includes: a stick supporting means 9 for supporting the stick 8 at a position 7 located downwardly of suspending portions 4 of hooks 5 each having the suspending portion 4 for suspending the loop 3 of the sausages 2; a first stick transferer 14 which is raised from a lowermost position 11 located downwardly of the stick 8 supported by the stick supporting means 9 to an upper position 13 located upwardly of the hooks 5 to raise the stick 8 moved onto the first stick transferer 14 from the stick supporting means 9, and which is subsequently lowered to the lowermost position 11; and a second stick transferer 15 which is provided at a position upwardly distant from the hooks 5 and which is raised to an uppermost position 17 located upwardly of the upper position 13 to raise the stick 8, which has been moved onto the second stick transferer 15 from the first stick transferer 14, to the uppermost position 17, and which is subsequently lowered toward the upper position 13 to lower the stick 8 with the loops 3 of the sausages 2 suspended therefrom.

10 Claims, 19 Drawing Sheets

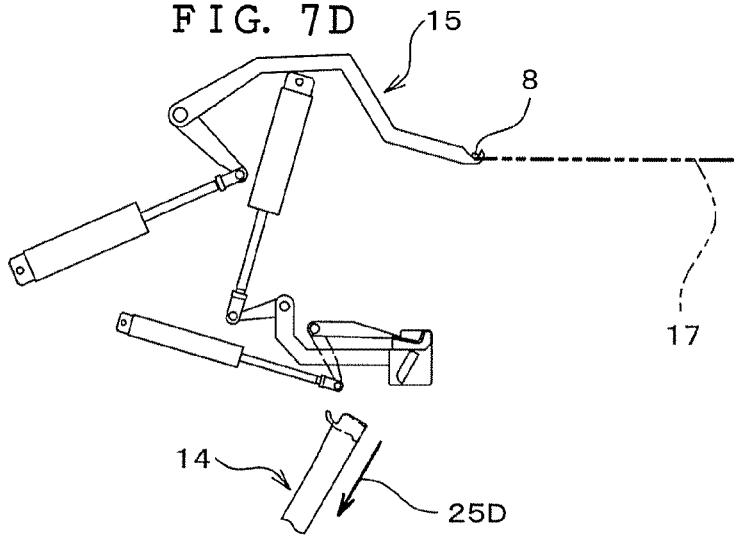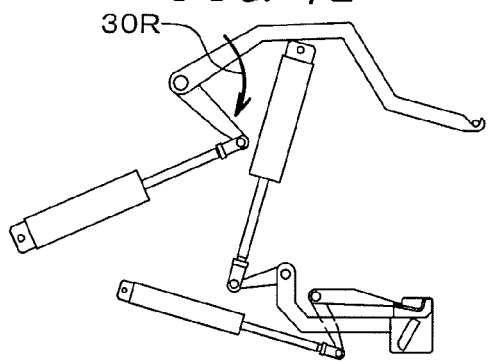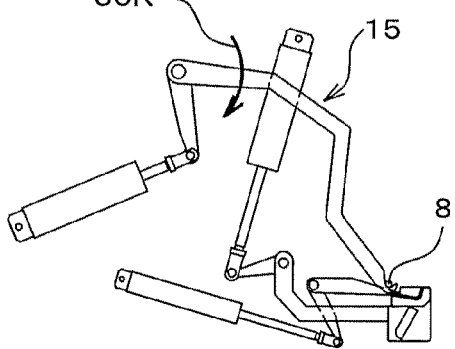

METHOD AND APPARATUS FOR TRANSFERRING A STICK FOR SUSPENDING LOOPS OF SAUSAGES

TECHNICAL FIELD OF THE INVENTION

The present invention relates to a method and an apparatus for transferring a stick for suspending loops of sausages.

BACKGROUND ART

Sausages suspended from a smoke stick are subjected to heat treatment in a smoke house. To improve the productivity of heat treatment, it is necessary to use a longer smoke stick and suspend longer and a greater number of sausage loops from the smoke stick. Conventionally, sausage suspending apparatuses having wider hook intervals than the diameter of the sausage have been used. However, to enhance the productivity of heat treatment, there has been a demand for suspending longer and a greater number of sausage loops from the stick by using a sausage suspending apparatus having hook intervals close to the diameter of the sausage or hook intervals narrower than the diameter of the sausage.

As the above-described conventional apparatus, it is possible to cite the apparatus disclosed in FIGS. 3 to 4-3 of JP-A-2003-158991. A stick reciprocally transferring means driving means 17 disposed at a position downwardly distant from hooks 4 reciprocatingly moves a stick reciprocally transferring means 16 between a lowered end position (5) and a raised end position (6). If longer sausage loops are suspended from the stick in this conventional apparatus, a case can occur in which the distance between the raised end position (6) and the hook 4 is shorter than the length of the sausage loop, in which case there can occur a case in which the loop cannot be removed from the hook 4.

In another conventional apparatus disclosed in FIGS. 10 and 11 of JP-A-2006-197935, a stick reciprocally transferring means driving means 58 disposed at a position upwardly distant from hooks 4 is disclosed. The stick reciprocally transferring means driving means 58 reciprocatingly moves a stick reciprocally transferring means 56 between a lowered end position VII and a raised end position VIII. In this conventional apparatus as well, if an attempt is made to suspend longer sausage loops from the stick, a case can occur in which the distance to the raised end position VII is shorter than the length of the sausage loop, and there can occur a case in which the loop cannot be removed from the hook 4.

A primary object of the invention is to provide a method and an apparatus for transferring a stick for suspending loops of sausages, which make it possible to reliably remove from hooks a multiplicity of long sausage loops suspended at narrow pitches by the raising of the stick, and which yield high productivity.

A secondary object of the invention is to provide a method and an apparatus for transferring a stick for suspending loops of sausages, which make it possible to reliably remove from hooks long sausage loops having slender and long sausage links by the raising of the stick, and which yield high productivity.

SUMMARY OF THE INVENTION

According to the present invention, the above-described object concerning a method of transferring a stick for sausages is achieved by a method for transferring a stick for suspending loops of sausages, comprising:

a step of causing the stick at a stick supporting position located downwardly of suspending portions of hooks each having the suspending portion for suspending the loop of the sausages to enter into the loops respectively suspended from the suspending portions;

a first stick raising step of raising a first stick transferer from a lowermost position located downwardly of the stick to an upper position located upwardly of the hooks to raise the stick from the stick supporting position to the upper position;

a second stick raising step of raising a second stick transferer provided at a position upwardly distant from the hooks to an uppermost position located upwardly of the upper position to raise the stick moved onto the second stick transferer from the first stick transferer;

a first stick transferer lowering step of lowering the first stick transferer from the upper position to the lowermost position; and a stick lowering step of lowering the second stick transferer from the uppermost position toward the upper position to lower the stick with the loops of the sausages suspended therefrom toward the upper position.

The above-described object concerning an apparatus for carrying out the above-described method is achieved by an apparatus for transferring a stick for suspending loops of sausages, comprising:

stick supporting means for supporting the stick at a position located downwardly of suspending portions of hooks each having the suspending portion for suspending the loop of the sausages;

a first stick transferer which is raised from a lowermost position located downwardly of the stick supported by the stick supporting means to an upper position located upwardly of the hooks to raise the stick moved onto the first stick transferer from the stick supporting means, and which is subsequently lowered to the lowermost position; and a second stick transferer which is provided at a position upwardly distant from the hooks and which is raised to an uppermost position located upwardly of the upper position to raise the stick, which has been moved onto the second stick transferer from the first stick transferer, to the uppermost position, and which is subsequently lowered toward the upper position to lower the stick with the loops of the sausages suspended therefrom.

According to the above-described invention, the following advantages are obtained.

(a) A multiplicity of long sausage loops suspended at narrow pitches can be reliably removed from the hooks by the raising of the stick.

(b) Long sausage loops having slender and long sausage links can be reliably removed from the hooks by the raising of the stick.

(c) The first stick transferer and the second stick transferer which are raised and lowered on the substantially vertical line are provided in a vertical direction, and the stick is raised to the position higher than the hooks by the first stick transferer, and that stick is moved onto the second stick transferer and is raised to the uppermost position by the second stick transferer. Therefore, the long sausage loops can be reliably removed from the hooks and can be suspended from the stick. The long sausage loops can be reliably removed from the hooks and can be suspended from the stick by merely moving the first and the second stick transferers in the vertical direction.

(d) Since the distance of movement in the raising and lowering of the first stick transferer and the second stick transferer can be made small, it is possible to reduce the idle time of the apparatus and enhance the positional accuracy during the movement of the first stick transferer and the second stick transferer.

(e) Since the first-stick-transferer driving means is provided at a position downwardly distant from the hooks, and the second-stick-transferer driving means is provided at a position upwardly distant from the hooks, the first-stick-transferer driving means and the second-stick-transferer driving means can be made compact.

(f) Since the use of the compact first-sick-transferer driving means at the position downwardly distant from the hooks is made possible, it is possible to reliably remove the long sausage loops from the hooks although the apparatus has such a hook height as to facilitate the end processing operation of the sausage loops.

DETAILED DESCRIPTION OF THE INVENTION

Referring now to the accompanying drawings, a description will be given of the embodiments of the invention.

First Embodiment

Prior to the description of a first embodiment, a description will be given of positional relationships among the respective parts in the apparatus of this embodiment in FIGS. 1 to 8, as well as a situation concerning the suspension of loops of sausages.

Figure 3:
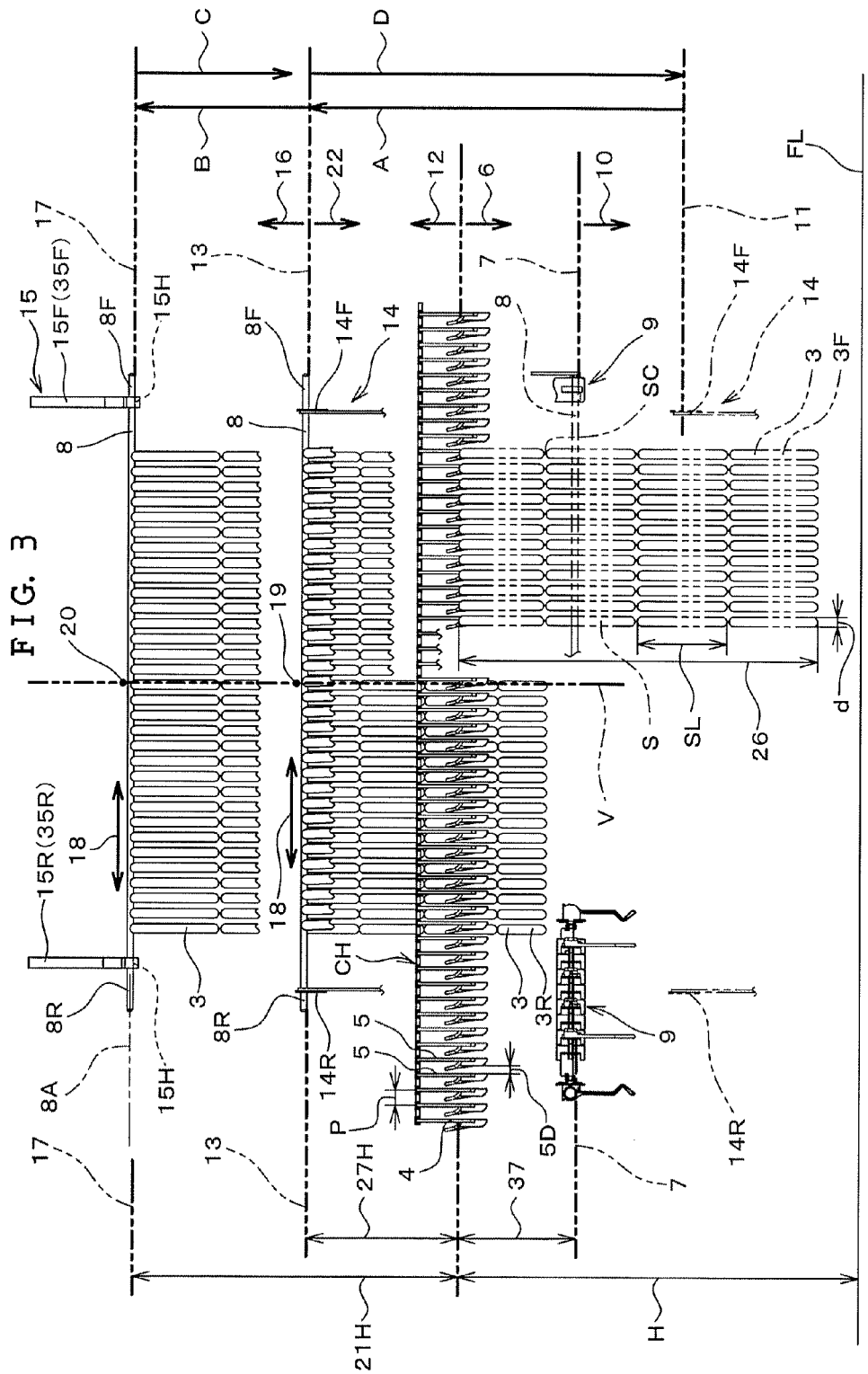
FIG. 3 is a diagram illustrating essential portions corresponding to FIG. 1, and illustrating a state in which a second stick transferer has moved to an uppermost position from an upper position.
Figure 8:
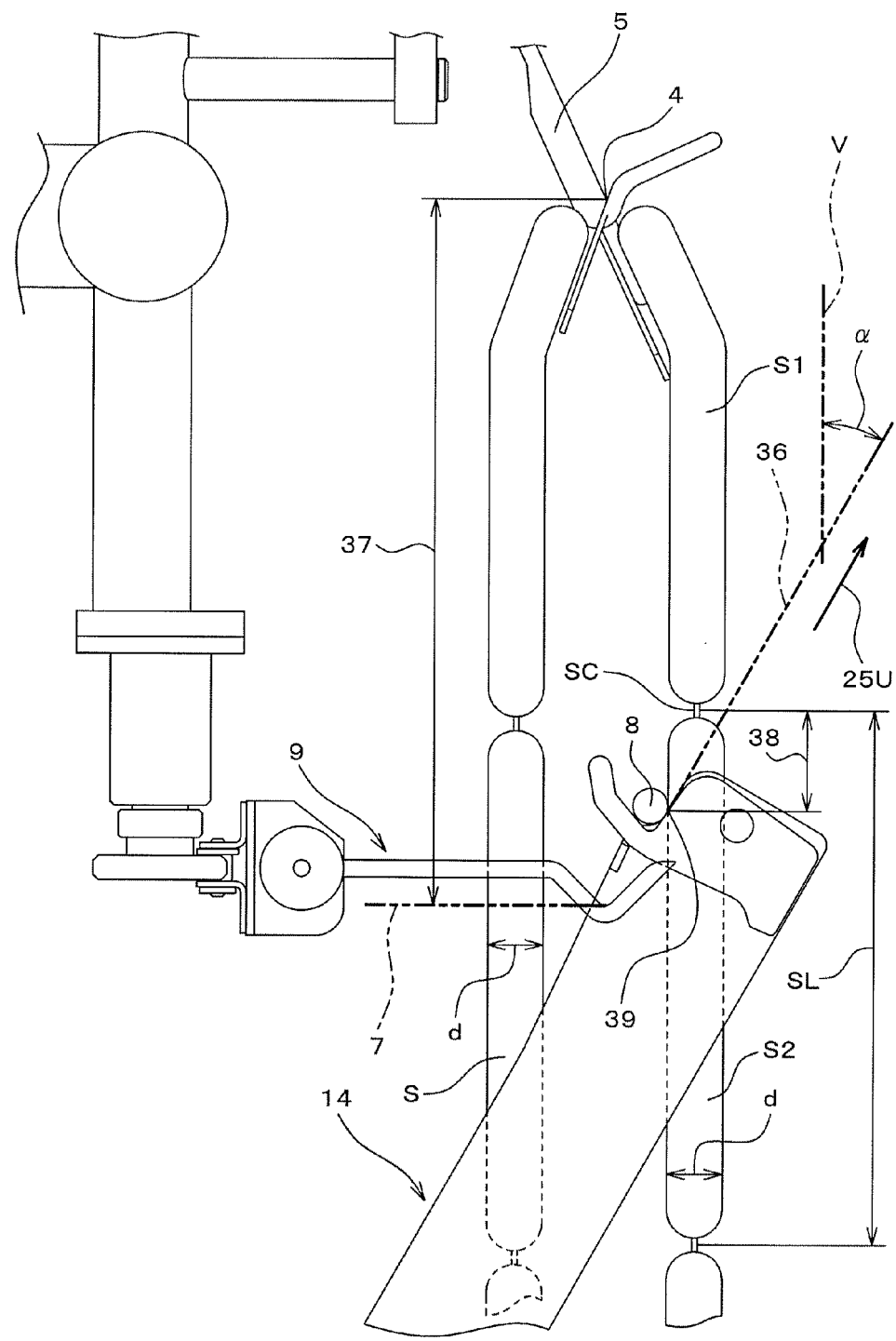
FIG. 8 is a diagram illustrating further essential portions of FIG. 2 and illustrating the first stick transferer.
Figure 9:
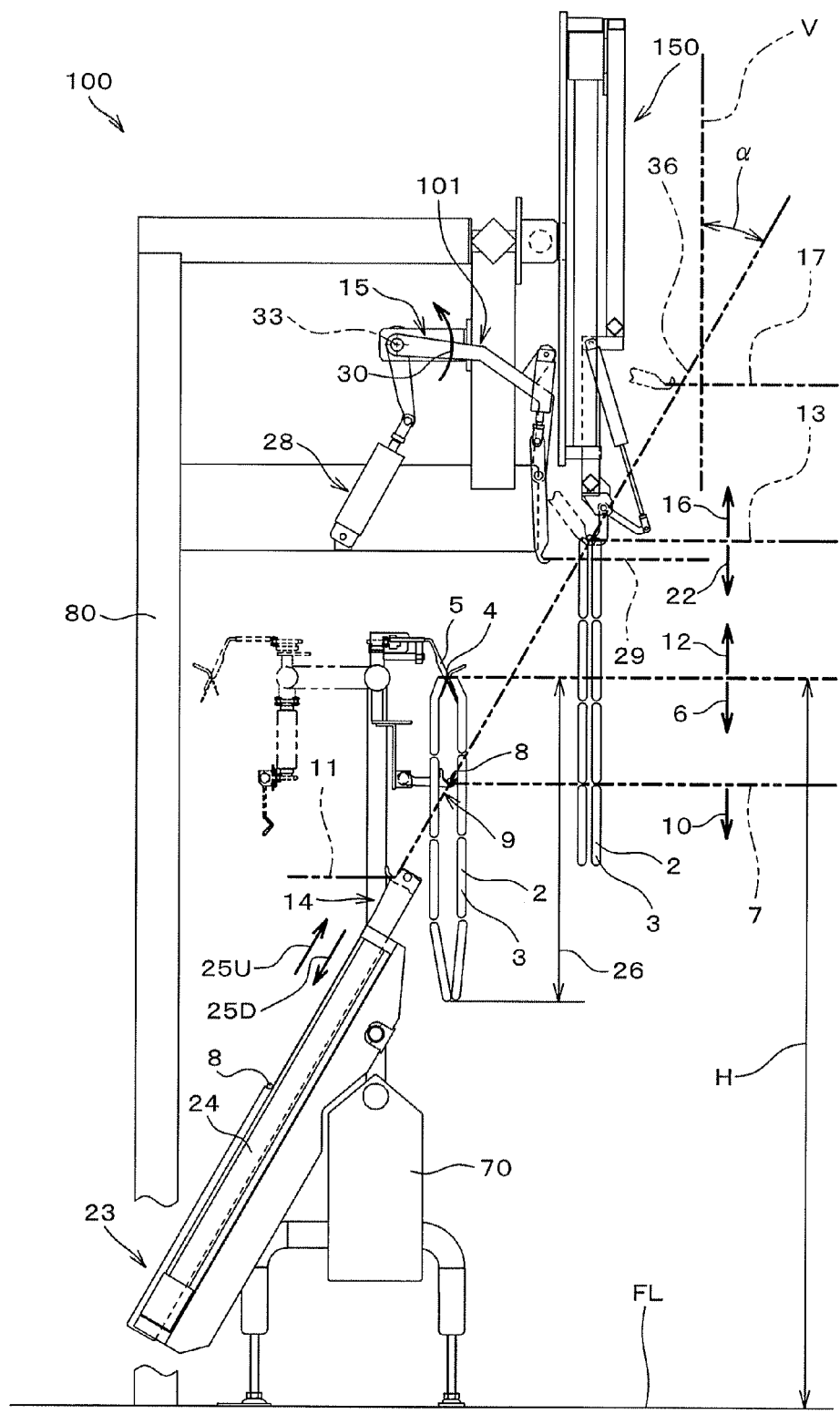
FIG. 9 is a side elevational view illustrating essential portions of an apparatus in accordance with a second embodiment.

Referring mainly to FIGS. 3 and 8, reference character H denotes the height from a floor FL to a suspending portion 4 of a hook 5. Reference character SL denotes the length of one sausage link S. Reference character d denotes a stuffed diameter of one sausage link S. Reference character SC denotes a linking portion which joins a first sausage link S1 and a second sausage link S2 suspended from the suspending portion 4. Reference character 5D denotes an interval between the hook 5 and the hook 5. Reference numeral 26 denotes a suspended length of the loop 3 from the suspending portion 4 of the hook 5. Reference character 21H denotes a distance in a substantially vertical direction V between the suspending portion 4 of the hook 5 and an uppermost position 17. Reference character 27H denotes a distance in the substantially vertical direction V between the suspending portion 4 of the hook 5 and an upper position 13. Reference numeral 37 denotes a distance in the substantially vertical direction V between the suspending portion 4 of the hook 5 and a stick supporting position 7. Reference numeral 38 denotes a distance between the linking portion SC and an abutment point 39 against the sausage link S2 by a stick 8 on a moving path 36.

The hook height H is set to such a height that the end processing operation by an operator with respect to a front loop 3F and a rear loop 3R of the chain of sausages 2 suspended from the hooks 5 is facilitated. To suspend a greater number of loops 3 from the stick 8, the mounting pitch P of the hooks 5 on a looper chain CH is set to be small. The interval 5D is narrower than the mounting pitch P of the hooks 5. There are cases where the interval 5D is set to be identical to or narrower than the stuffed diameter d. The loop 3 of the chain of sausages 2 is removed from the hook 5 through this interval 5D. The distance 37 is longer than the link length SL of the sausage link S. An angle of inclination α is set to not more than 45 degrees, i.e., an angle at which the loop 3 is easily removed from the hook 5, preferably not more than 30 degrees.

As shown in FIGS. 1 to 8, an apparatus 1 for transferring a stick for suspending loops of sausages in accordance with this embodiment includes a stick supporting means 9 for supporting the stick 8 at the position 7 located downwardly (in the direction of arrow 6) of the suspending portions 4 of the hooks 5 each having the suspending portion 4 for suspending the loop 3 of the sausages 2; a first stick transferer 14 which is raised from a lowermost position 11 (see FIG. 2) located downwardly (in the direction of arrow 10) of the stick 8 supported by the stick supporting means 9 to the upper position 13 (see FIG. 2) located upwardly (in the direction of arrow 12) of the hooks 5, so as to raise the stick 8 moved from the stick supporting means 9 to the upper position 13; and a second stick transferer 15 (see FIG. 2) which is provided at a position upwardly (in the direction of the arrow 12) distant from the hooks 5, and which is raised to the uppermost position 17 located upwardly (in the direction of arrow 16) of the aforementioned upper position 13 so as to raise the stick 8 moved from the first stick transferer 14 to the uppermost position 17, and is subsequently lowered toward the upper position 13 so as to lower the stick 8 with the loops 3 of the sausages 2 suspended therefrom. The aforementioned hooks 5 can be easily understood by referring to FIGS. 1 and 3, and are arranged in a multiple number at a fixed pitch in an orthogonal direction to the plane of the drawing in FIG. 2. The sausages are formed spirally into loops and are suspended by the plurality of hooks 5. These hooks are movable from the rear side toward the front side in the direction of their arrangement, and are intermittently stopped.

Referring to FIGS. 3 to 6, the first stick transferer 14 rises in a state in which it holds the stick 8 taken up and moved onto the first stick transferer 14 from the stick supporting member 9, and also holds an ensuing stick 8 to be supplied to the stick supporting member 9. During the lowering of the first stick transferer 9, the ensuing stick 8 is supplied onto the stick supporting means 9, and the stick supporting means 9 supports it.

Reference numeral 70 denotes a looper frame of an apparatus for suspending loops of sausages from hooks, and reference numeral 80 denotes a main frame, both being provided uprightly on the floor FL. The hooks 5, the stick supporting means 9, and the first stick transferer 14 are provided on the looper frame 70, while the second stick transferer 15, a second-stick-transferer driving means 28, and a stick carrying-out means 150 are provided on the main frame 80.

Figure 5:
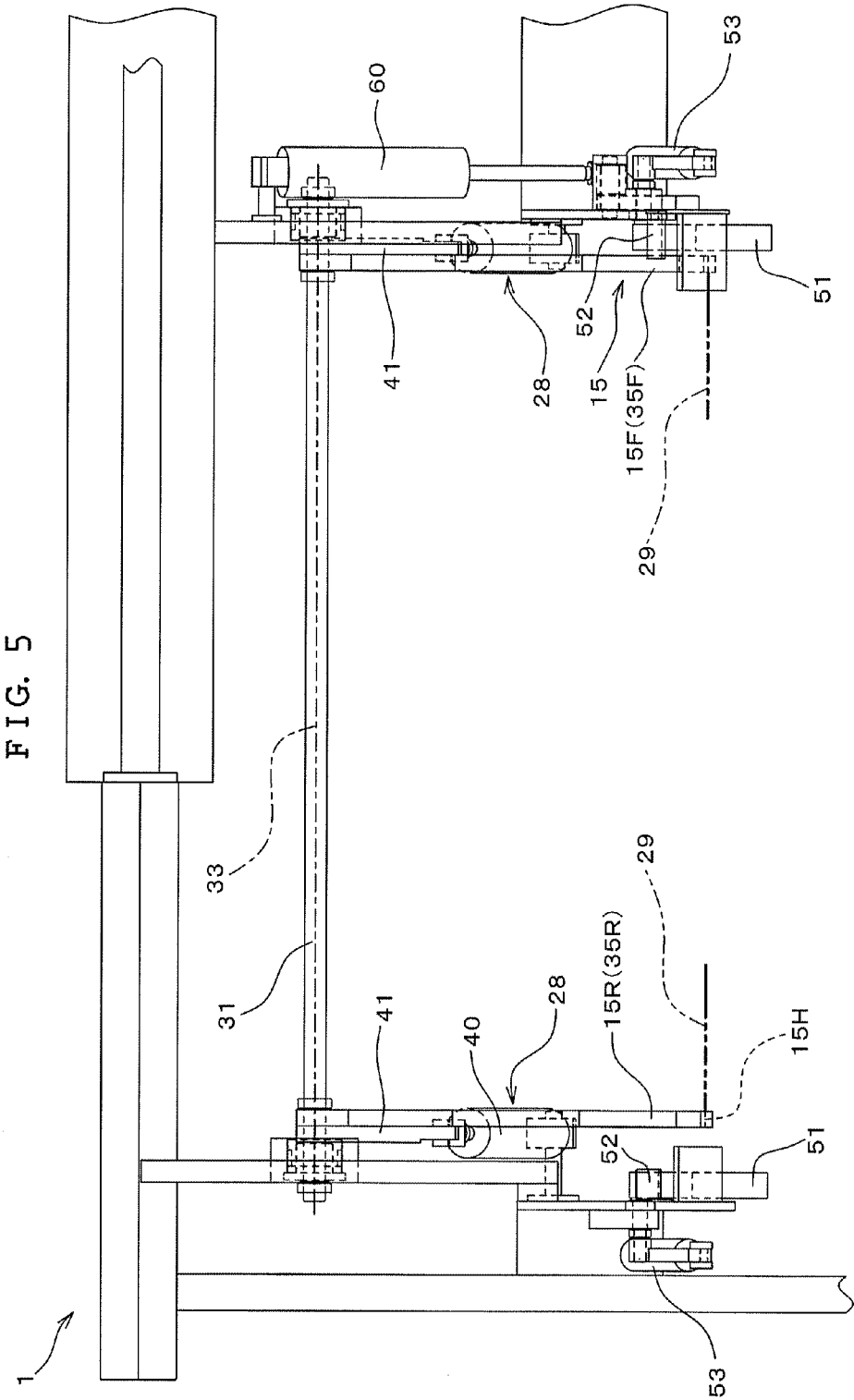
FIG. 5 is a plan view of the apparatus of FIG. 2, illustrating the essential portions of the apparatus of FIG. 1.

The first stick transferer 14 includes a front first stick transferer 14F located in the front and a rear first stick transferer 14R located in the rear, while the second stick transferer 15 includes a front second stick transferer 15F located in the front and a rear second stick transferer 15R located in the rear (see FIGS. 3 and 5). Reference numeral 19 denotes a first center point in the longitudinal direction (conforming to the direction of arrangement of the hooks) (in the direction of arrow 18) of the stick 8 between the front first stick transferer 14F and the rear first stick transferer 14R, and reference numeral 20 denotes a second center point in the longitudinal direction (in the direction of the arrow 18) of the stick 8 between the front second stick transferer 15F and the rear second stick transferer 15R. Reference character V denotes a substantially vertical line on the first center point 19 and the second center point 20, i.e., a center line of the first stick transferer 14 and the second stick transferer 15. The first stick transferer 14 is disposed at a downward position distant from the second stick transferer 15. The first stick transferer 14 and the second stick transferer 15 are adapted to be raised and lowered on the common substantially vertical line V with respect to a longitudinal axis 8A of the stick 8. The first stick transferer 14 and the second stick transferer 15 may be respectively adapted to be raised and lowered on separate substantially vertical lines V with respect to the longitudinal axis 8A of the stick 8.

Figure 1:
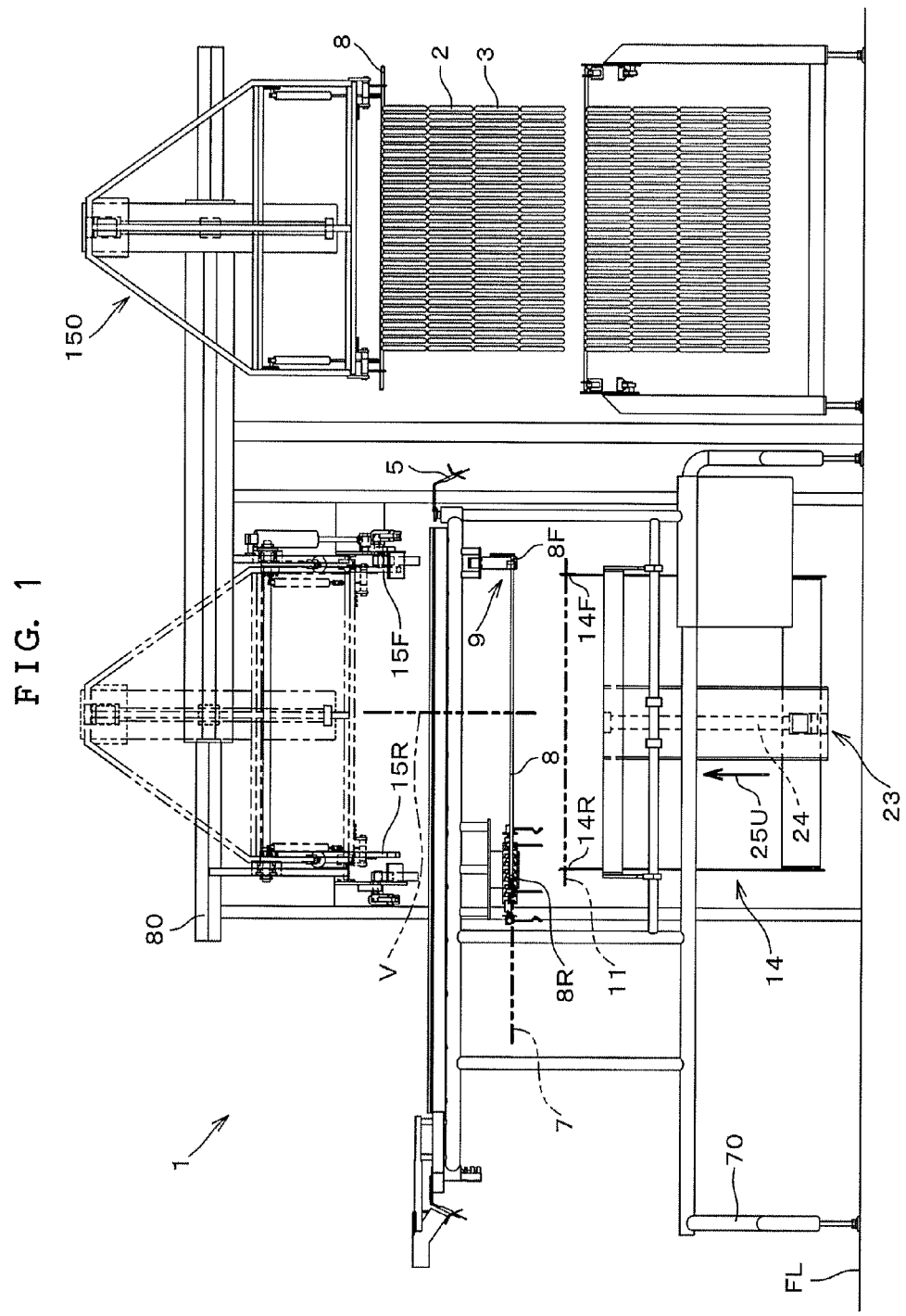
FIG. 1 is a front elevational view taken from an orthogonal direction to the longitudinal direction of a stick, and illustrating a schematic configuration of the apparatus in accordance with an embodiment of the invention.
Figure 2:
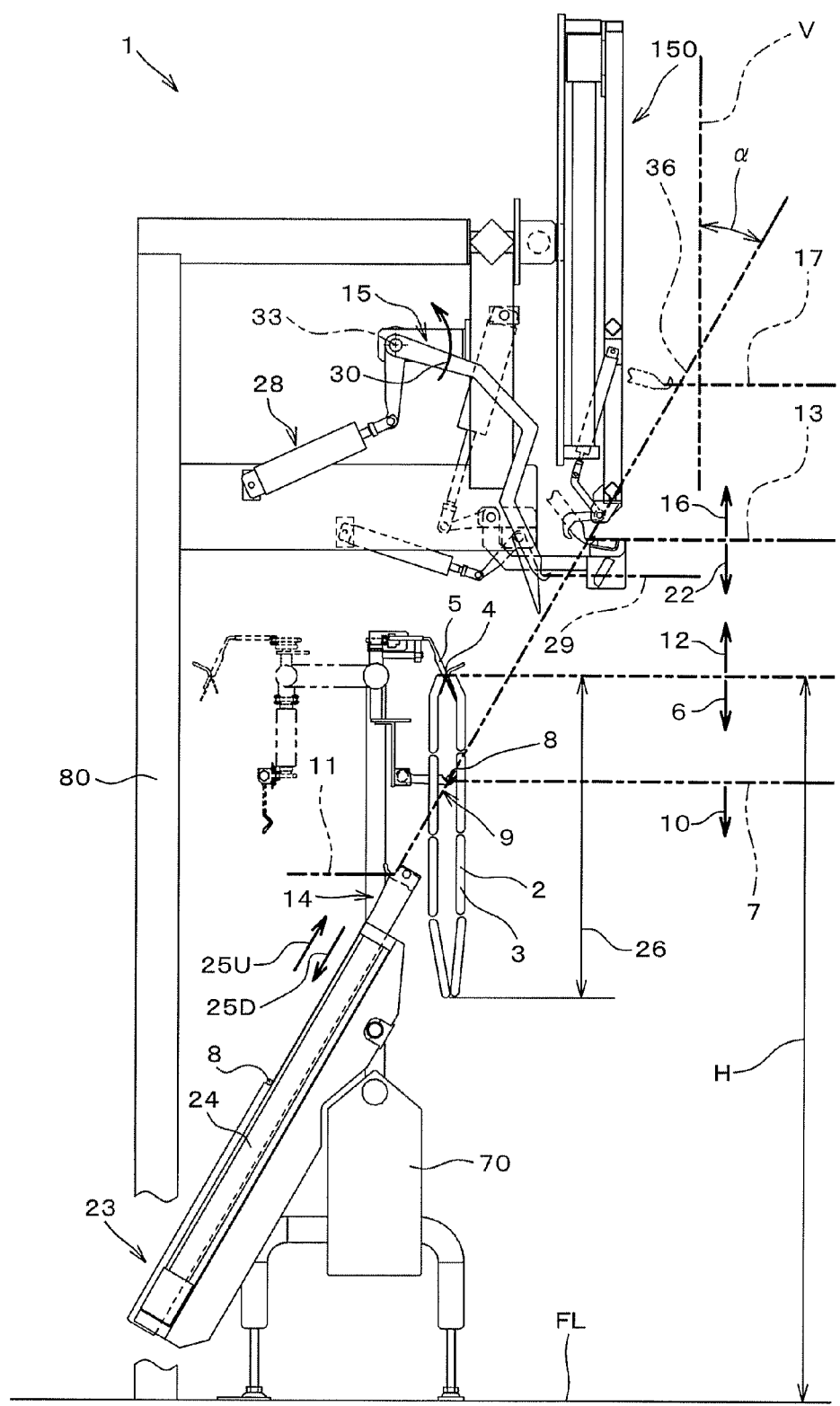
FIG. 2 is a side elevational view taken from the longitudinal direction of the stick, and illustrating essential portions of the apparatus of FIG. 1.

In FIG. 2, reference numeral 23 denotes a first-stick-transferer driving means for reciprocatingly moving the first stick transferer 14 between the lowermost position 11 and the upper position 13. The first-stick-transferer driving means 23 has a linear actuator 24 disposed at a position downwardly (in the direction of the arrow 6) distant from the hooks 5 and in an attitude of being inclined upward at the angle of inclination α toward the hooks 5. The first stick transferer 14 at the lowermost position 11 is mounted on the linear actuator 24. When the linear actuator 24 is actuated, the first stick transferer 14 is raised diagonally upward (in the direction of arrow 25U) from the lowermost position 11 toward the hooks 5. The angle of inclination α is an angle between the moving direction (the direction of arrow 25U and the direction of arrow 25D) of the linear actuator 24 and the substantially vertical line V. The raising and lowering of the first stick transferer 14 is not limited to the reciprocal linear movement, and may be reciprocating rotation similar to that of the second stick transferer 15.

The aforementioned upper position 13 is at a distance 27 from the suspending portion 4, which distance 27 is shorter than the length 26 of the loop 3 suspended from the suspending portion 4 of the hook 5, and the first stick transferer 14 is raised beyond the hook 5 until the stick 8 being held reaches the upper position 13.

Figure 6:
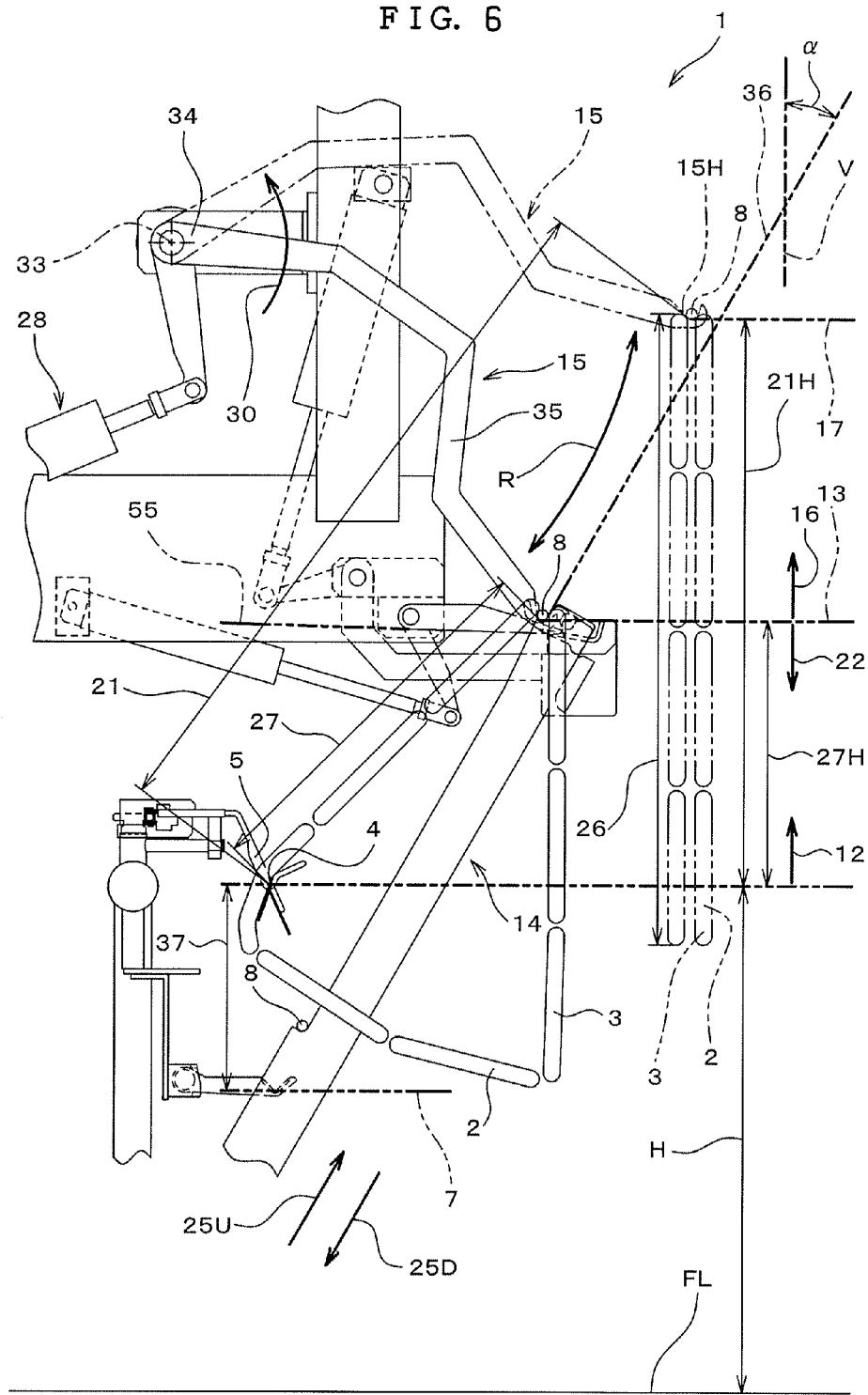
FIG. 6 is a diagram illustrating the essential portions corresponding to FIG. 2, and illustrating a state in which the second stick transferer is raised to the uppermost position.

In FIGS. 2 and 6, reference numeral 28 denotes the second-stick-transferer driving means disposed at a position upwardly (in the direction of the arrow 12) distant from the hooks 5. The second-stick-transferer driving means 28 raises and lowers the second stick transferer 15 in the directions of arrows R (FIG. 6) such that the stick 8 being held by the second stick transferer 15 is raised to the uppermost position 17 which is at a longer distance 21 from the suspending portion 4 than the length 26 of the loop 3, and is subsequently lowered toward the upper position 13.

The second stick transferer 15 has a pair of stick holding portions 15H which are raised by being rotated in the direction of arrow 30 from a starting point position 29 located downwardly (in the direction of arrow 22) of the upper position 13, abut from below (in the direction of the arrow 30) against a front portion 8F and a rear portion 8R of the stick 8 at the upper position 13 to move the stick 8 from the first stick transferer 14 onto the second stick transferer 15, and hold the front portion 8F and the rear portion 8R of the moved stick 8 (see FIGS. 4 and 6).

Figure 4:
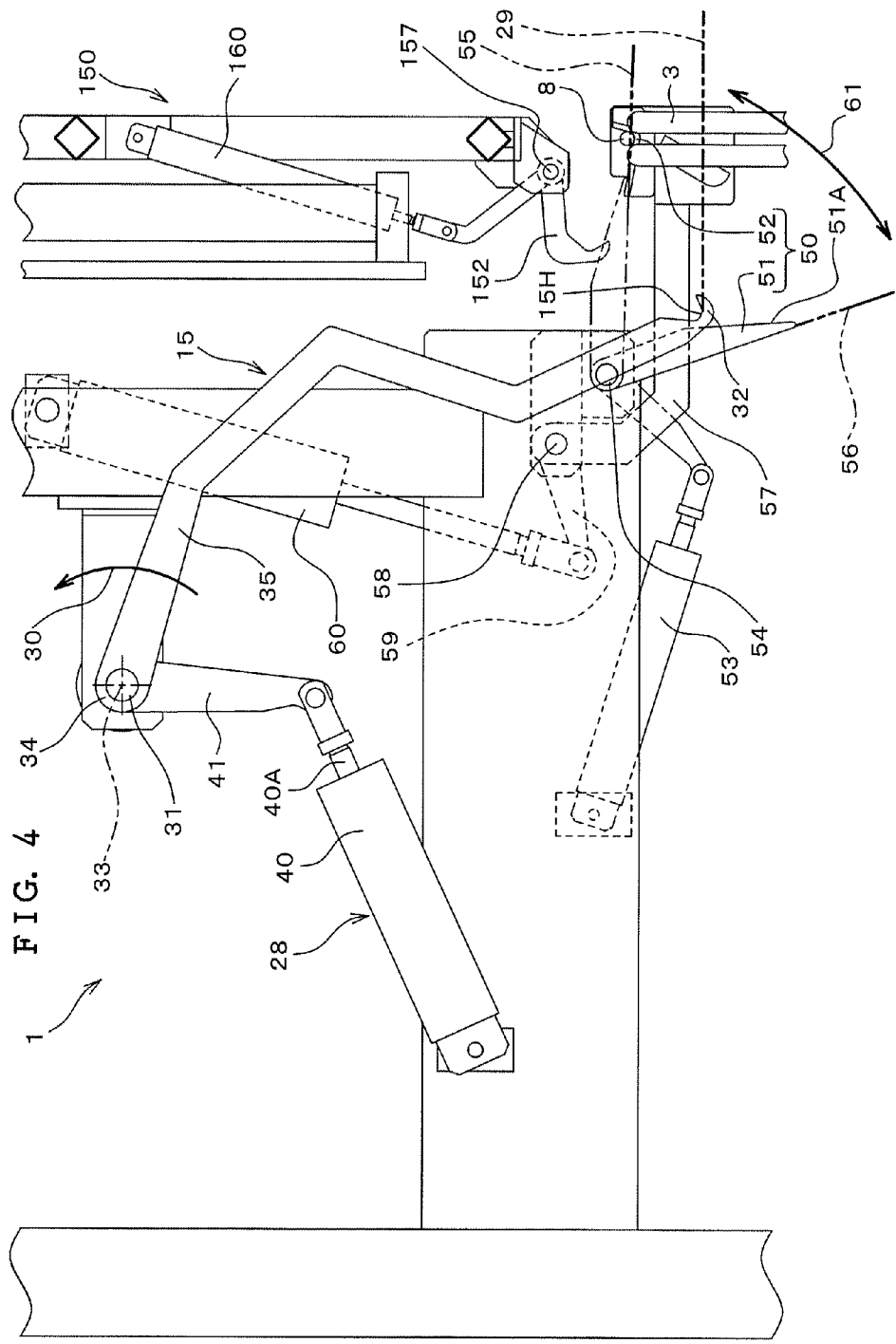
FIG. 4 is a diagram illustrating further essential portions of FIG. 2, and illustrating the second stick mover and a carrying-out apparatus.

In FIGS. 4 to 6, reference numeral 35 denotes an arm body provided in the second stick transferer 15.

The arm body 35 is connected to the second-stick-transferer driving means 28, i.e., an air cylinder unit 40 having a rod 40A in this embodiment, by means of a drive lever secured to a rotating shaft member 31. A front arm body 35F and a rear arm body 35R of the arm body 35 are secured to the rotating shaft member 31.

The arm body 35 has one portion 32 and another portion provided with a rotational center 33 for reciprocally rotating the one portion 32 in upward and downward directions (in the directions of the arrows R). A recessed portion, which is the aforementioned stick holding portion 15H, is formed in the one portion 32 of the arm body 35. The recessed portions 15H which are respectively formed in the front arm body 35F and the rear arm body 35R of the arm body are adapted to hold the stick 8 at a predetermined position of the arm body 35 by supporting the front portion 8F and the rear portion 8R of the stick 8 from below.

In FIGS. 2 and 6, reference numeral 36 denotes a rectilinear moving path along which the first stick transferer 14 reciprocates in the direction of the arrow 25U and the direction of arrow 25D, and this rectilinear moving path 36 is constituted by the angle of inclination α which is inclined upward toward the hooks 5. The rotational center 33 is disposed at a position which is on the hook 5 side from the moving path 36 and which is upwardly (in the direction of the arrow 12) distant from the hooks 5. in this embodiment, since the position of the rotational center 33 is set such that the upper position 13 and the uppermost position 17 are positioned in close proximity to the moving path 36, the change in the moving direction of the second stick transferer 15 being raised is small relative to the moving direction of the first stick transferer 14 during its raising. For this reason, the holding of the stick 8 is stabilized.

Since the second stick transferer 15 is provided with the arm body 35 having the one portion 32 for holding the stick and the other portion 34 provided with the rotational center 33 for reciprocally rotating the one portion 32 in the upward and downward directions (in the direction of arrow 34), the transferer can be raised and moved a longer distance by the compact stick-transferer driving means disposed above the hooks.

In such an apparatus of the first embodiment, the transfer of the stick with the loops of sausages suspended therefrom is performed sequentially by the following steps. Hereafter, referring to FIGS. 7A to 7J in addition to FIGS. 1 to 6, a description will be given of the steps.

(1) Entry Step

The stick 8 at the stick supporting position 7 located downwardly (in the direction of the arrow 6) of the suspending portions 4 of the hooks 5 each having the suspending portion 4 for suspending the loop 3 of the sausages 2 enters into the loops 3 suspended from the suspending portions 4.

(2) First Stick Raising Step (A)

Figure 7A:
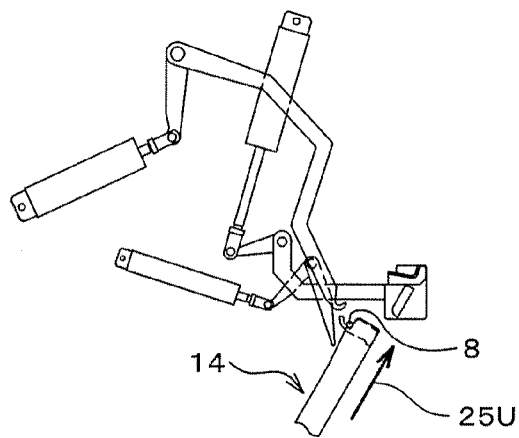
FIG. 7 is a diagram sequentially illustrating the operation of the first and the second stick transferers through FIGS. 7A to 7J.
Figure 7B:
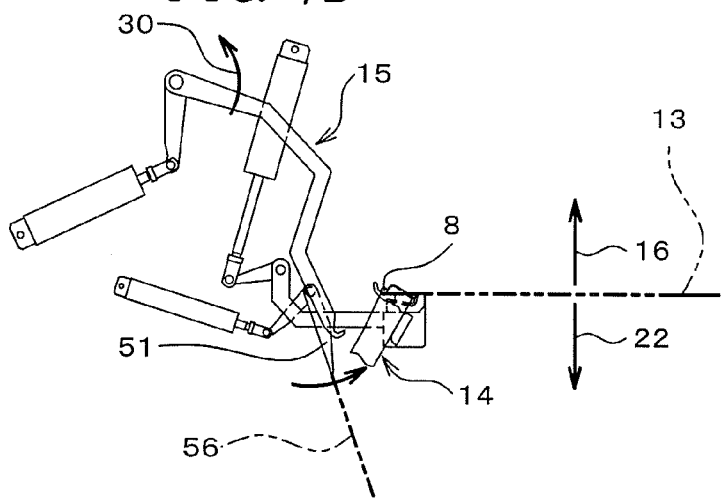

The first stick transferer 14 is raised from the lowermost position 11 located downwardly (in the direction of the arrow 10) of the stick 8 to the upper position 13 located upwardly (in the direction of the arrow 12) of the hooks 5, to thereby raise the stick 8 from the aforementioned stick supporting position 7 to the aforementioned upper position 13 (FIGS. 7A and 7B).

(3) Second Stick Raising Step (B)

Figure 7C:
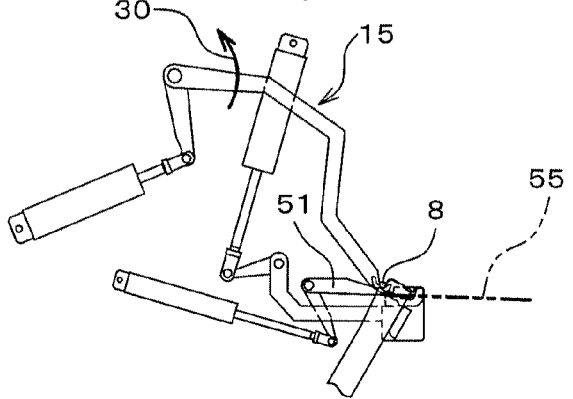
Figure 7G:
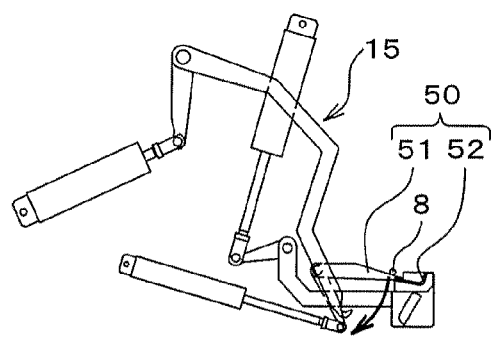

The second stick transferer 15 provided at a position upwardly (in the direction of the arrow 12) distant from the hooks 5 is raised to the uppermost position 17 located upwardly (in the direction of the arrow 16) of the aforementioned upper position 13, to thereby raise the stick 8, which has been moved onto the second stick transferer 15 from the first stick transferer 14, to the aforementioned uppermost position 17 (FIGS. 7C and 7D).

(4) First Stick Transferer Lowering Step (C)

The first stick transferer 14 is lowered from the aforementioned upper position 13 to the aforementioned lowermost position 11 (FIG. 7D).

(5) Stick Lowering Step (D)

The second stick transferer 15 is lowered from the aforementioned uppermost position 17 toward the aforementioned upper position 13 to thereby lower the stick 8 with the loops 3 of the sausages 2 suspended therefrom toward the aforementioned upper position 13 (FIG. 7E).

The apparatus of this embodiment is operated by undergoing the above-described steps. In the second stick raising step, while the second stick transferer 15 reaches the uppermost position 17, the loops 3 of the sausages d suspended from the stick 8 have been raised to a sufficient height for the loops 3 to be removed from the hooks 5. Even if the sausage 2 is caught between the adjacent two hooks 5, the aforementioned height is sufficient enough for the sausage 2 to be removed from between these hooks 5.

Thus, the loops 3 removed from the hooks 5 are suspended from the stick 8. In the above-described stick lowering step, the stick 8 is lowered toward the aforementioned upper position 13, and at an appropriate position this stick 8 with the loops 3 suspended therefrom is carried out for an ensuring processing step.

The above-described second stick raising step can be the step of: raising the second stick transferer 15 from the starting point position 29 located downwardly (in the direction of the arrow 22) of the upper position 13, causing the second stick transferer 15 to abut from below (in the direction of the arrow 30) against the front portion 8F and the rear portion 8R of the stick 8 at the upper position 13 to move the stick 8 from the first stick transferer 14 onto the second stick transferer 15, and holding the stick 8 by the portions 15H abutting against the front portion 8F and the rear portion 8R of the stick 8.

Meanwhile, the above-described stick lowering step can be the step of: lowering the second stick transferer 15 to the starting point position 29.

Furthermore, the above-described second stick raising step can be the step of: starting the raising of the second stick transferer 15 after the second stick transferer 15 clamps and holds the front portion 8F and the rear portion 8R of the stick 8 at the upper position 13.

Meanwhile, the above-described stick lowering step can be the step of: lowering the second stick transferer 15 toward the upper position 13.

In this embodiment, the arrangement provided is such that after the second stick transferer 15 is lowered from the uppermost position 17 toward the upper position 13, at an appropriate position the stick 8 is removed from that second stick transferer 15 and is carried out for the ensuring processing step of the sausages 2. In this embodiment, a receiving means may be provided at this position of removal of the stick 8, and the stick 8 may be received thereby so as to be ready for the carrying out of the stick 8.

The apparatus shown in FIGS. 1 to 8 is provided with a receiving means 50 as a preferable form, and a description will be given of this receiving means 50.

As is well shown in FIGS. 4 to 6, the receiving means 50 is disposed between the uppermost position 17 of the second stick transferer 15 and the hooks 5 in the upward and downward directions, and has a movable (rotatable in the illustrated example) relay member 51 and a stick placing member 52. The relay member 51 is provided at a position adjacent to the second stick transferer 15 in the longitudinal direction of the stick, is formed as an arm member rotatable together with a shaft member 54 by the actuation of a cylinder unit 53, and rotates between a receiving position 55 at which the relay member 51 is oriented laterally after being raised and a standby position 56 at which the relay member 51 is oriented downward after being lowered. The aforementioned relay member 51 has at the aforementioned receiving position 55 an inclined surface 51A (see FIG. 4) with a gradient falling toward its leading. The inclined surface 51A at the receiving position 55 is provided at a position of abutment against a lower surface of the stick 8 being supported by the second stick transferer 15 when the second stick transferer 15 is lowered from the uppermost position 17 toward the starting point position 29. Due to this abutment, the stick 8 is received by the aforementioned inclined surface 51A, and the second stick transferer 15 reaches the aforementioned starting point position 29 in the state in which the stick 8 is absent.

The stick 8 slides down on the aforementioned inclined surface 51A toward its leading end, and the aforementioned stick placing member 52 is provided at a position for receiving the slid stick 8 and placing it thereon, its upper surface being formed into a substantially V-shaped groove for placing the stick 8 in a stable position. However, in the invention, the form of this stick placing member 52 is not limited.

In the above-described embodiment, when the first stick transferer 14 holding the stick 8 with the loops 3 of the sausages 2 suspended therefrom moves from the uppermost position 17 to the starting point position 29, the relay member 51 is at the lowered standby position 56 so as not to interfere with that stick 8, and allows the passage of the stick 8 on the aforementioned first stick transferer 14.

The stick placing member 52 of the receiving means 50 is adapted to be reciprocally rotated in directions of arrows 61 by an air cylinder unit 60 by means of an arm 57 and a lever 59 both secured to a rotating shaft member 58.

In this embodiment having the above-described receiving means 50, the transfer of the stick 8 with the loops of sausages suspended therefrom is carried out subsequent to the already described steps (1) to (5), as follows:

(6) When the second stick transferer 15 is lowered from the uppermost position 17 toward the starting point position 29 via the upper position 13, during its lowering the stick 8 is moved onto the relay member 51 of the receiving means 50 and is placed thereon, and the second stick transferer 15 itself is further lowered in a state in which the stick 8 is absent (FIG. 7F).

Figure 7H:
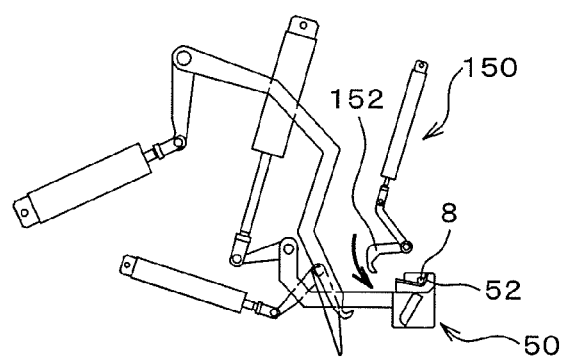

(7) The relay member 51 has the inclined surface 51A, and the stick 8 slides down on this inclined surface 51A, drops from the leading end of that relay member 51, and is received by the stick placing member 52 (see FIG. 7H).

Figure 7I:
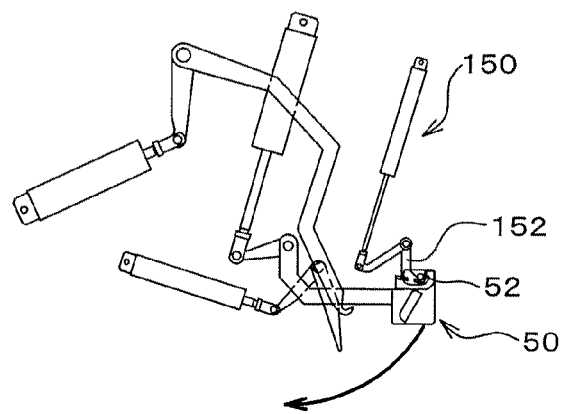
Figure 7J:
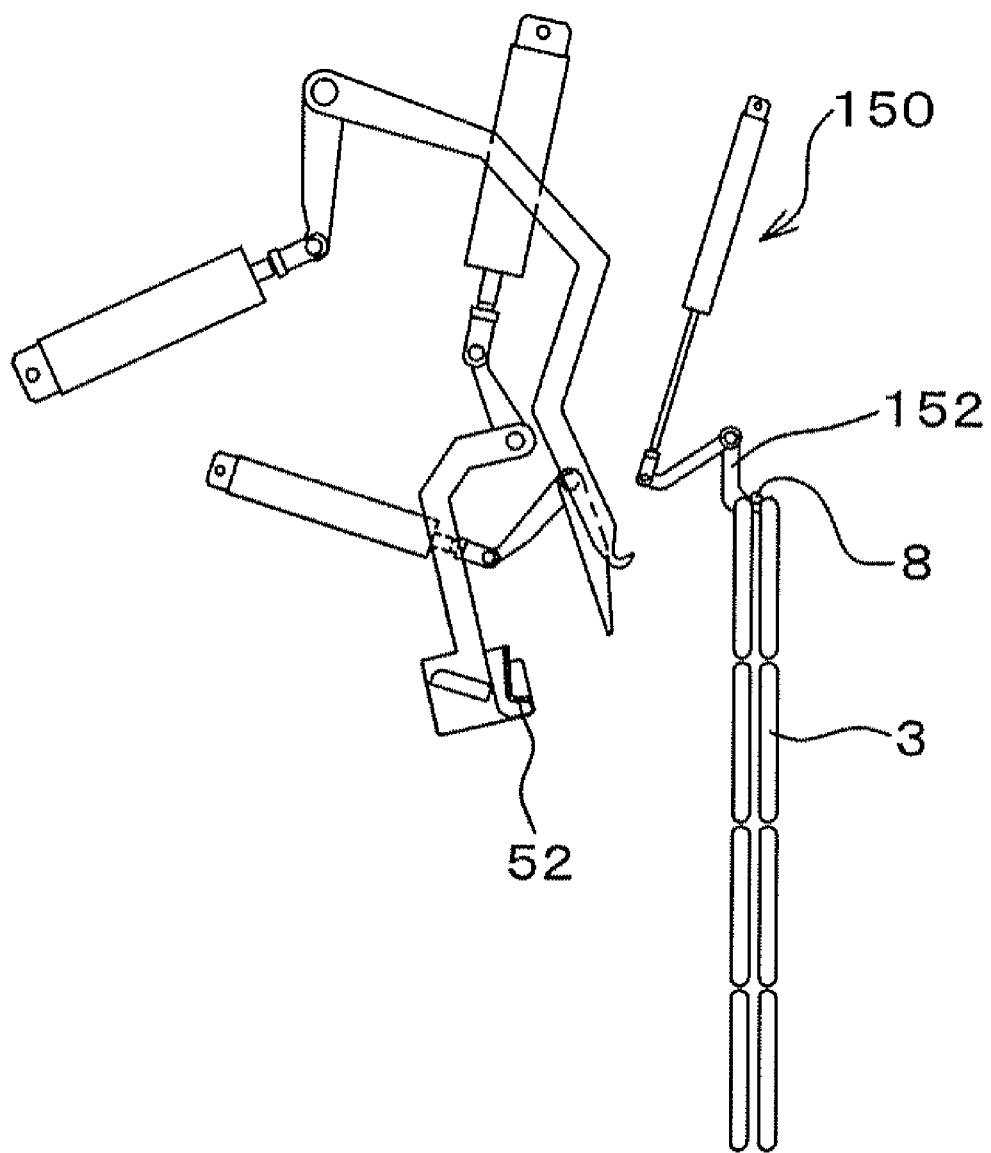

(8) In due course of time, the stick 8 is carried out by the carrying-out means 150, e.g., an arm body-shaped stick taking-up member 152. In this case, to allow the stick 8 to prepare for the time of being carried out in its longitudinal direction, the stick placing member 52 of the receiving means 50 moves in the direction indicated by the arrow in FIG. 7I, so as to retreat to a position where no hindrance is caused to the movement of the carrying-out means 150 in the aforementioned longitudinal direction (FIGS. 7H to 7J).

Subsequently, the relay member 51 is at the receiving position 55 after having been raised, and the stick 8 which is now held by the second stick transferer 15 is lowered while being held by this second stick transferer 15. During this time, the stick 8 abuts against the aforementioned relay member 51, is received by the relay member 51, slides down thereon, and reaches the stick placing member 52. The stick 8 is carried out from the stick placing member 52 by the carrying-out means 150 which will be described later.

Next, referring to FIGS. 3 and 7, a description will be given of the positional relationship between the rising stick 8 and the linking portion SC of the sausage 2 suspended from the hook 5. The sausage link S whose stuffed diameter d is narrow and whose link length SL is long is likely to easily undergo the bending of the sausage link S at its portion subjected to the abutment by the stick 8 which is raised on the moving path 36. To cope with this, in the apparatus 1, the distance between the suspending portion 4 and the linking portion SC which joins the first sausage link S1 suspended from the suspending portion 4 of the hook 5 and the second sausage link S2 is set to be shorter than the distance between the suspending portion 4 and the lower stick supporting position 7 distant from the suspending portion 4 of the hook 5. Further, the supporting position 7 of the stick 8 and the angle of inclination α of the moving path 36 are correlated with the link length SL of the sausage 2 such that the position of abutment of the stick 8 against the sausage link S2 on the moving path 36 of the first stick transferer is located downwardly of the linking portion SC.

Since the sausage link is thus adapted to receive the abutment of the stick 8 at the distance 38 lower than the linking portion SC, the stick 8 is raised in the direction of the arrow 25U while lifting up the sausage link S2, and during its raising the stick 8 is engaged with the linking portion SC. If the angle of inclination α is preferably set to 30 degrees, the aforementioned engagement between the stick 8 and the linking portion SC is made more reliable. Thus, the stick 8 is able to raise the linking portion SC up to the upper position 13 while maintaining its state of retaining the linking portion SC.

Second Embodiment

Next, a description will be given of an apparatus 100 for transferring a stick for suspending loops of sausages in accordance with a second embodiment shown in FIGS. 9 to 14. In the apparatus 1, the stick carrying-out means 150 carried out the stick 8 on the stick placing member 52 of the stick receiving means 50. However, the apparatus 100 differs from the apparatus 1 mainly in that the apparatus 100 has the stick carrying-out means 150 which receives the stick 8 held by the second stick transferer 15 having an arm body 101 and which carries out the stick 8 in an orthogonal direction to the plane of the drawing in FIG. 9.

In the drawing, the second stick transferer 15, the second-stick-transferer driving means 28, and the stick carrying-out means 150 are provided on the main frame 80. The arm body 101 shown in FIG. 10 consists of a configuration in which a first arm body 102 having the one portion 32 and a second arm body 103 having the other portion 34 are connected. A connecting member 104 for rotatably connecting the first arm body 102 and the second arm body 103 is provided between the one portion 32 and the other portion 34. In the same way as in the apparatus 1, the recessed portion 15H, which is the aforementioned stick holding portion, is formed in the one portion 32, while the other portion 34 is provided with the rotational center 33 for causing the one portion 32 for holding the stick 8 to reciprocally rotate in the upward and downward directions (in the directions of the arrows R).

Figure 12:
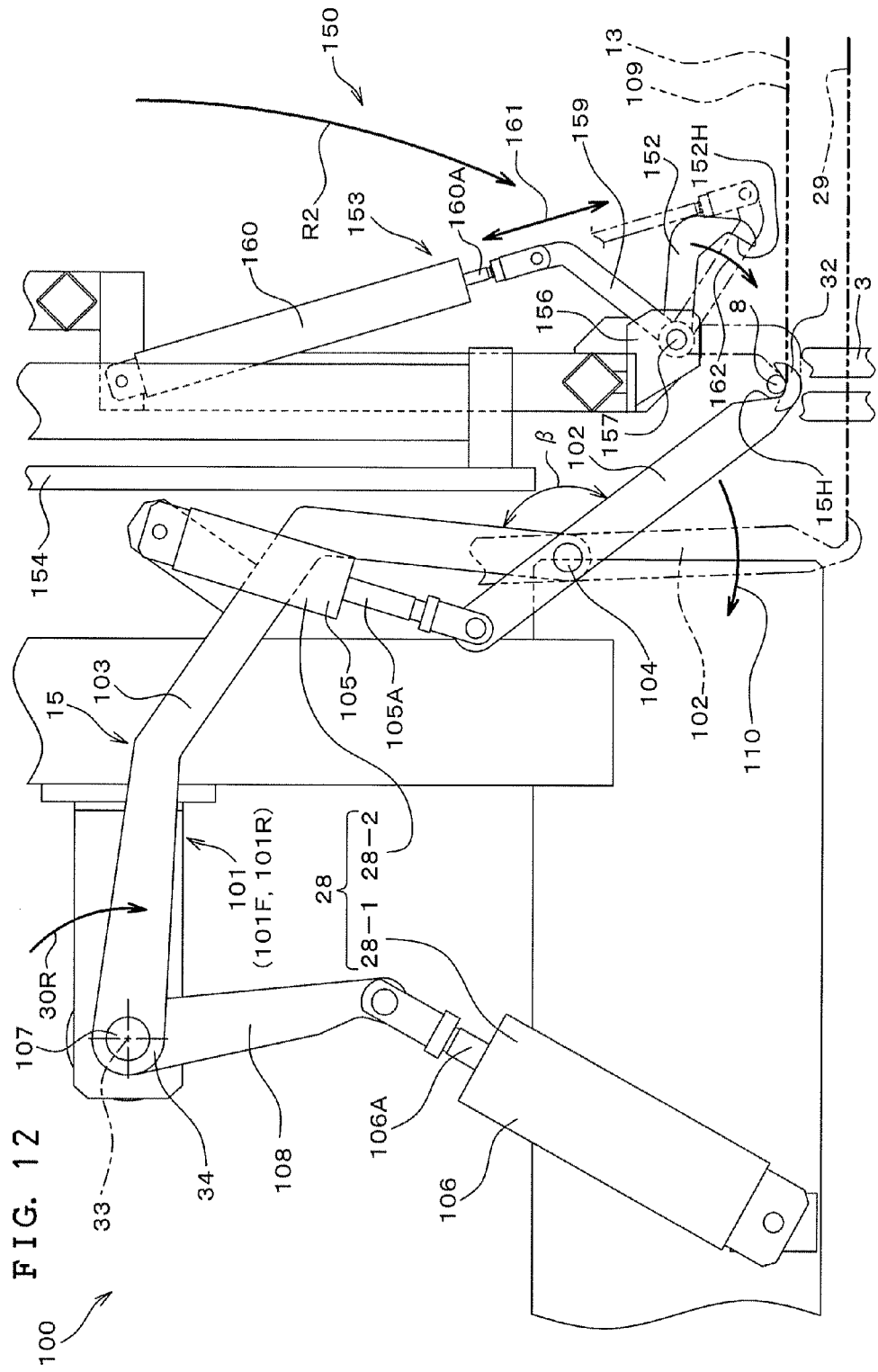
FIG. 12 is a diagram corresponding to FIG. 11, and illustrating a state in which the second stick transferer is lowered from the uppermost position to an upper position.
Figure 13:
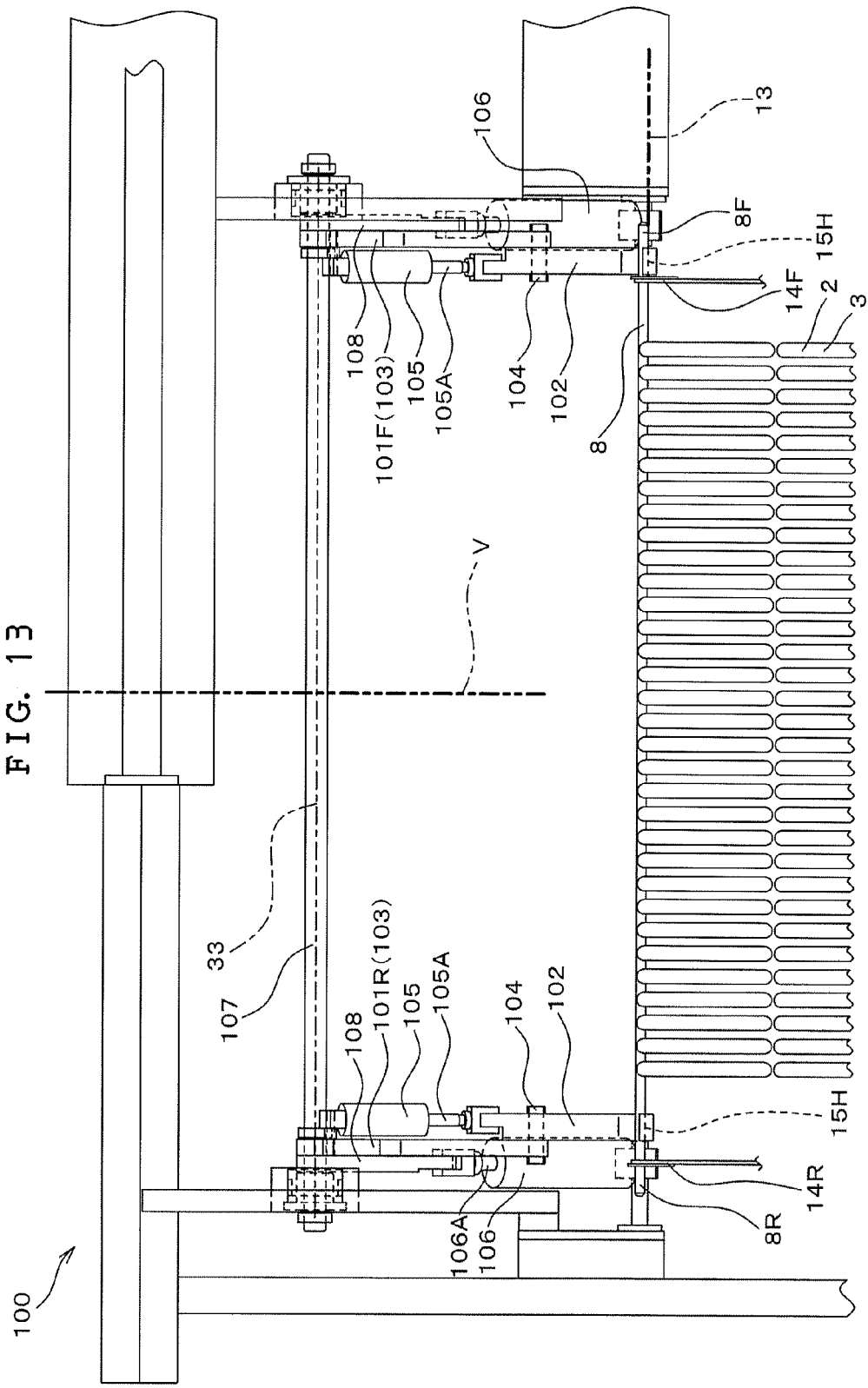
FIG. 13 is a front elevational view of the second stick transferer of the apparatus of the second embodiment in FIG. 8, and illustrating a state in which the second stick transferer is at the upper position.

In this apparatus 100, the second-stick-transferer driving means 28 has a main second-stick-transferer driving means 28-1 and a subordinate second-stick-transferer driving means 28-2. As for the second stick transferer 15 at the upper position 13 shown in FIG. 12, the first arm body 102 is located at the upper position 13, and a stick holding angle β formed by the first arm body 102 and the second arm body 103 is maintained at a predetermined angle by the subordinate second-stick-transferer driving means 28-2, i.e., an air cylinder unit 105 in this embodiment. The air cylinder unit 105 is fixedly provided on the second arm body 103, and its rod 105A is connected to the first arm body 102. The main second-stick-transferer driving means 28-1, i.e., a known air cylinder unit 106 having a rod 106A in this embodiment, is connected to a drive lever 108 secured to a rotating shaft member 107, and a front arm body 101F and a rear arm body 101R are secured to the rotating shaft member 107, as shown in FIG. 13. The respective recessed portions 15H of the front arm body 101F and the rear arm body 101R are adapted to hold the front portion 8F and the rear portion 8R of the stick 8 at the upper position 13.

Figure 11:
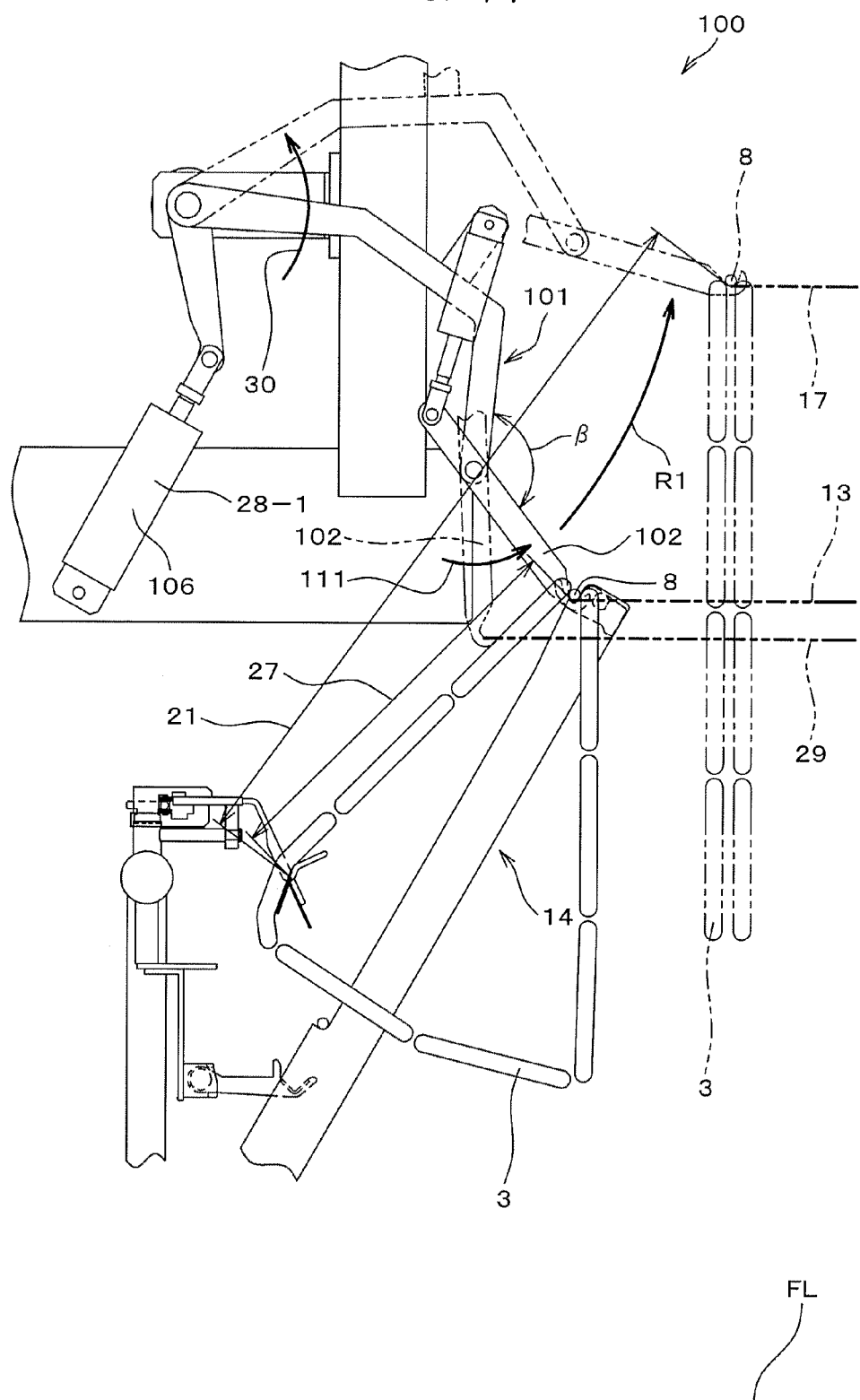
FIG. 11 is a diagram corresponding to FIG. 9, and illustrating a state in which the second stick transferer is raised to the uppermost position.

The arm body 101 shown in FIGS. 11 and 13 is rotated in the direction of arrow 30 by the actuation of the air cylinder unit 106, thereby allowing the recessed portions 15H holding the front portion 8F and the rear portion 8R of the stick 8 to be raised from the upper position 13 to the uppermost position 17 in the direction of arrow R1. Subsequently, the arm body 101 holding the stick 8 with the loops 3 suspended therefrom is rotated reversely in the direction of arrow 30R, so that the recessed portions 15H are lowered from the uppermost position 17 to a stick carrying-out position 109, i.e., the upper position 13 in this example, in the direction of arrow R2, and stop there (FIG. 12). The arm body 101 has its stick holding angle β maintained at the predetermined angle by the air cylinder unit 105 during the above-described raising and lowering.

Figure 14:
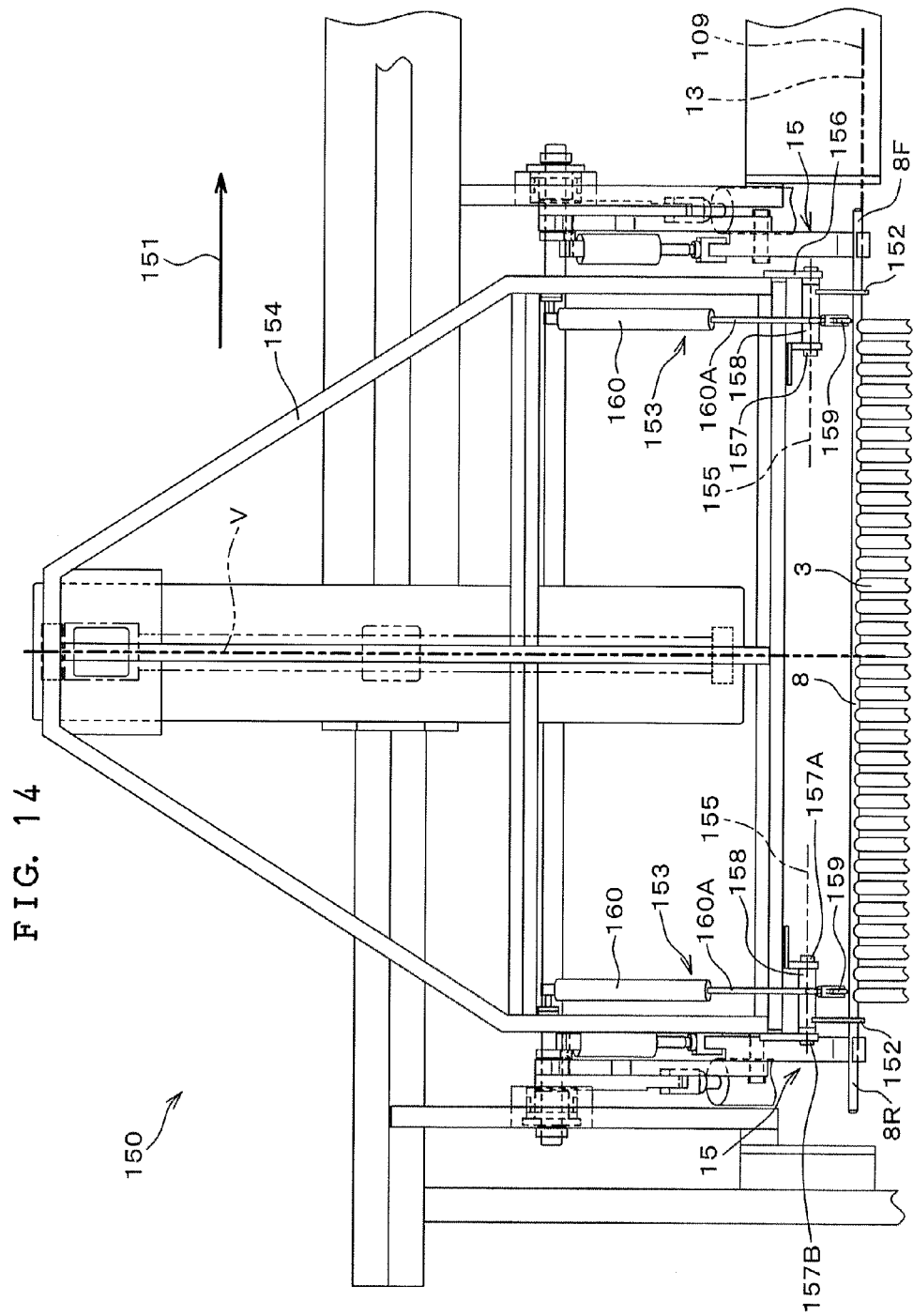
FIG. 14 is a front elevational view of the carrying-out apparatus of the apparatus of the second embodiment in FIG. 8.

As shown in FIG. 12, the first arm body 102 which was lowered in the direction of the arrow R2 and stopped at the upper position 13 remains at a standstill at the upper position 13 until the stick carrying-out means 150, which will be described later, receives from the first arm body 102 the stick 8 with the loops 3 suspended therefrom. Upon taking up of the stick 8 from the first arm body 102 by the stick carrying-out means 150, the first arm body 102 is rotated in the direction of arrow 110, is lowered from the upper position 13 to the starting point position 29, and remains on standby at the starting point position 29 in preparation for the carrying out of the stick 8 by the stick carrying-out means 150 in the direction of arrow 151 (FIG. 14). The air cylinder unit 105 is actuated to lower the first arm body 102, and rotates the first arm body 102 about the connecting member 104 in the direction of the arrow 110. The air cylinder unit 105 which maintained the stick holding angle β at the predetermined angle is thus configured to be actuated to change the stick holding angle β of the arm body 101. It should be noted that the stick carrying-out position 109 may be set to be higher or lower than the upper position 13 in connection with the stick carrying-out means 150.

Figure 10:
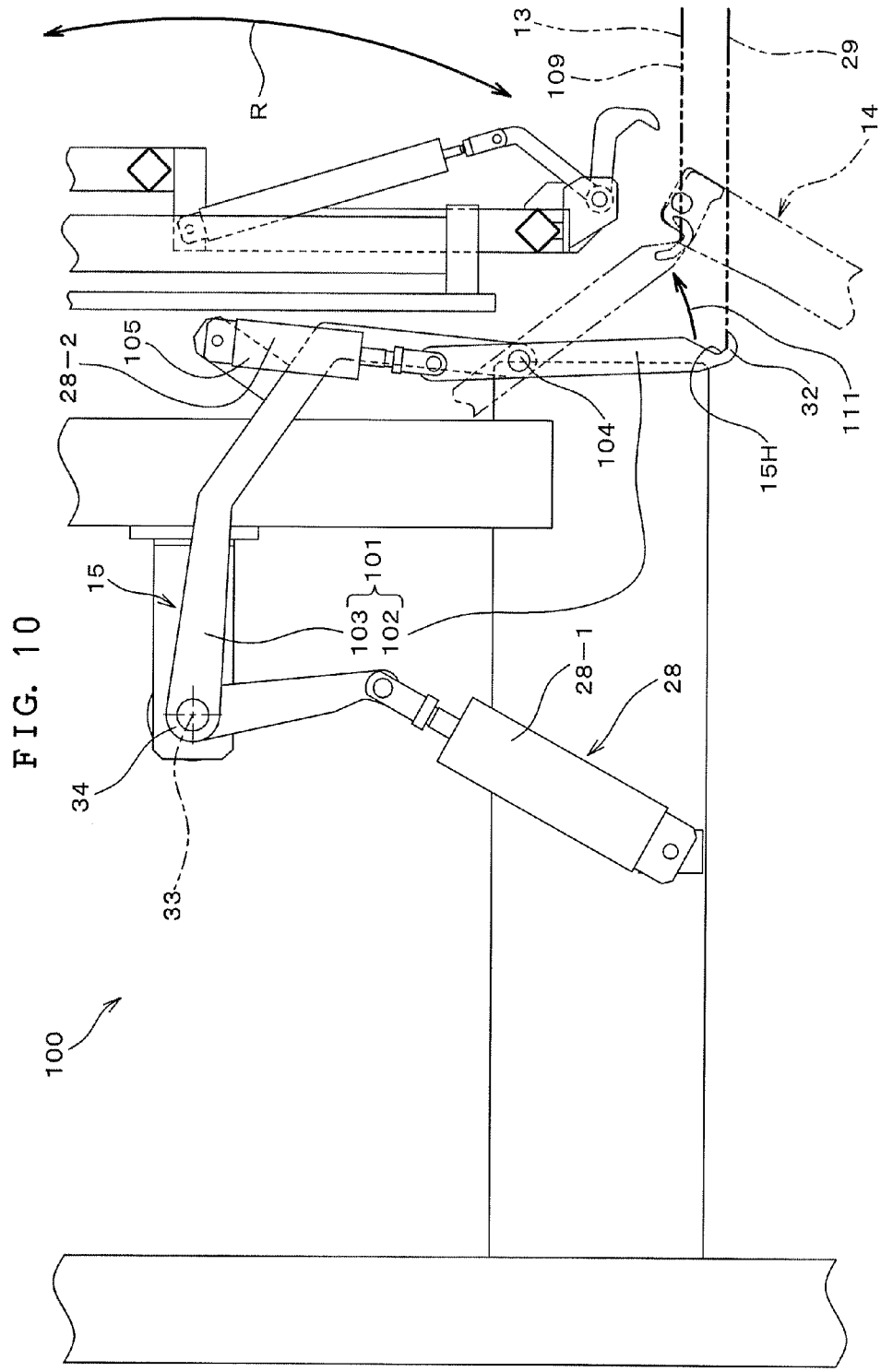
FIG. 10 is a diagram illustrating further essential portions of FIG. 9.

Referring to FIG. 10, as the ensuing stick 8 is being raised to the upper position 13 by the first stick transferer 14, the air cylinder unit 105 is actuated to rotate the first arm body 102 at the starting point position 29 in the direction of arrow 111 to thereby raise the first arm body 102 to the upper position 13. By the above-described raising of the first arm body 102 to the upper position 13, the arm body 101, which returned its stick holding angle β to the predetermined angle, starts to be raised in the direction of the arrow R1 by receiving the actuation of the main second-stick-transferer driving means 28-1, as shown in FIG. 11. The arm body 101 abuts against the stick 8 from below, moves the stick 8 from the first stick transferer 14, and is raised to the uppermost position 17 while holding the stick 8.

Referring to FIG. 11, in this apparatus, the first arm body 102 is abutted against the stick 8 from below by the raising of the first arm body 102 due to the actuation of the main second-stick-transferer driving means 28-1, and the stick 8 is raised from the first stick transferer 14. Instead of this method, the first arm body 102 may be abutted against the stick 8 from below by the raising of the first arm body 102 due to the actuation of the subordinate second-stick-transferer driving means 28-2 without starting the actuation of the main second-stick-transferer driving means 28-1, and after the stick 8 is raised from the first stick transferer 14 to a predetermined height, the main second-stick-transferer driving means 28-1 may be actuated to raise the first arm body 102 together with the second arm body 103.

The stick carrying-out means 150 shown in FIG. 14 is a means which takes up on the substantially vertical line V from the second stick transferer 15 the stick 8 on the second stick transferer 15 which was lowered to the stick carrying-out position 109, i.e., the upper position 13 in this example, and carries out the stick 8 in the longitudinal direction (direction of the arrow 151) of the stick 8 from the substantially vertical line V in a state of supporting the stick 8 with the sausage loops 3 suspended therefrom. The stick carrying-out means 150 includes the pair of stick taking-up members 152 shaped in hook form, a pair of stick-taking-up-member rotating means 153 for rotating the stick taking-up members 152, and a stick carrying-out frame 154 which is at a standstill on the substantially vertical line V. The pair of stick taking-up members 152 and the stick-taking-up-member rotating means 153 are mounted on the stick carrying-out frame 154. The stick carrying-out frame 154 is adapted to move from the substantially vertical line V in the direction of the arrow 151 when the stick taking-up members 152 takes up the stick 8.

Referring to FIG. 12 as well, the stick taking-up members 152 are adapted to rotate about a rotational axis 155 in the direction of arrow 162 (clockwise direction in FIG. 12) to take up the stick 8 on the second stick transferer 151 from the second stick transferer 15 to thereby support the front portion 8F and the rear portion 8R, respectively, of the stick 8. The stick-taking-up-member rotating means 153 includes a shaft member 157 fixed to the stick carrying-out frame 154 by means of brackets 156; a lever 159 having a tubular body 158 which is reciprocally rotatably fitted on the shaft member 157; and an air cylinder unit 160 having a rod 160A connected to the lever 159. Since the stick taking-up member 152 is secured to tubular body 158, stick taking-up member 152 is reciprocally rotated about the rotational axis 155 by the actuation of the air cylinder unit 160 in the direction of arrow 161.

Since both end portions 157A and 157B of the shaft member 157 are supported by the brackets 156 secured to the stick carrying-out frame 154, durability performance is high with respect to the stick 8 with the heavy loops 3 suspended therefrom. Maintainability is high since the stick taking-up member 152 is rotated by the lever 159 which is connected to the air cylinder unit 160 of a reciprocating type.

As the stick taking-up member 152 is rotated about the rotational axis 155 (in the direction of the arrow 162), a recessed portion 152H formed in the stick taking-up member 152 slightly scoops up the stick 8 from below in such a manner as to clamp the stick 8 in cooperation with the recessed portion 15H holding the stick 8 on the second stick transferer 15. The stick 8 taken up by the recessed portion 152H is carried out by the movement of the stick carrying-out frame 154.

Thus, the stick carrying-out means 150 takes up the stick 8 on the second stick transferer 15 which was lowered to the stick carrying-out position 109 located between the uppermost position 17 and the hooks 5, and carries out the stick 8 in the longitudinal direction (arrow 151) of the stick 8 in the state of supporting the stick 8.

Although the recessed portion 15H, which is the stick holding portion, is formed in the one portion 32 of the arm body 101 of the second stick transferer 15 in the above-described apparatus 100, the apparatus 100 may alternatively be configured with the one portion 32 provided with a stick clamping means 170.

Figure 15:
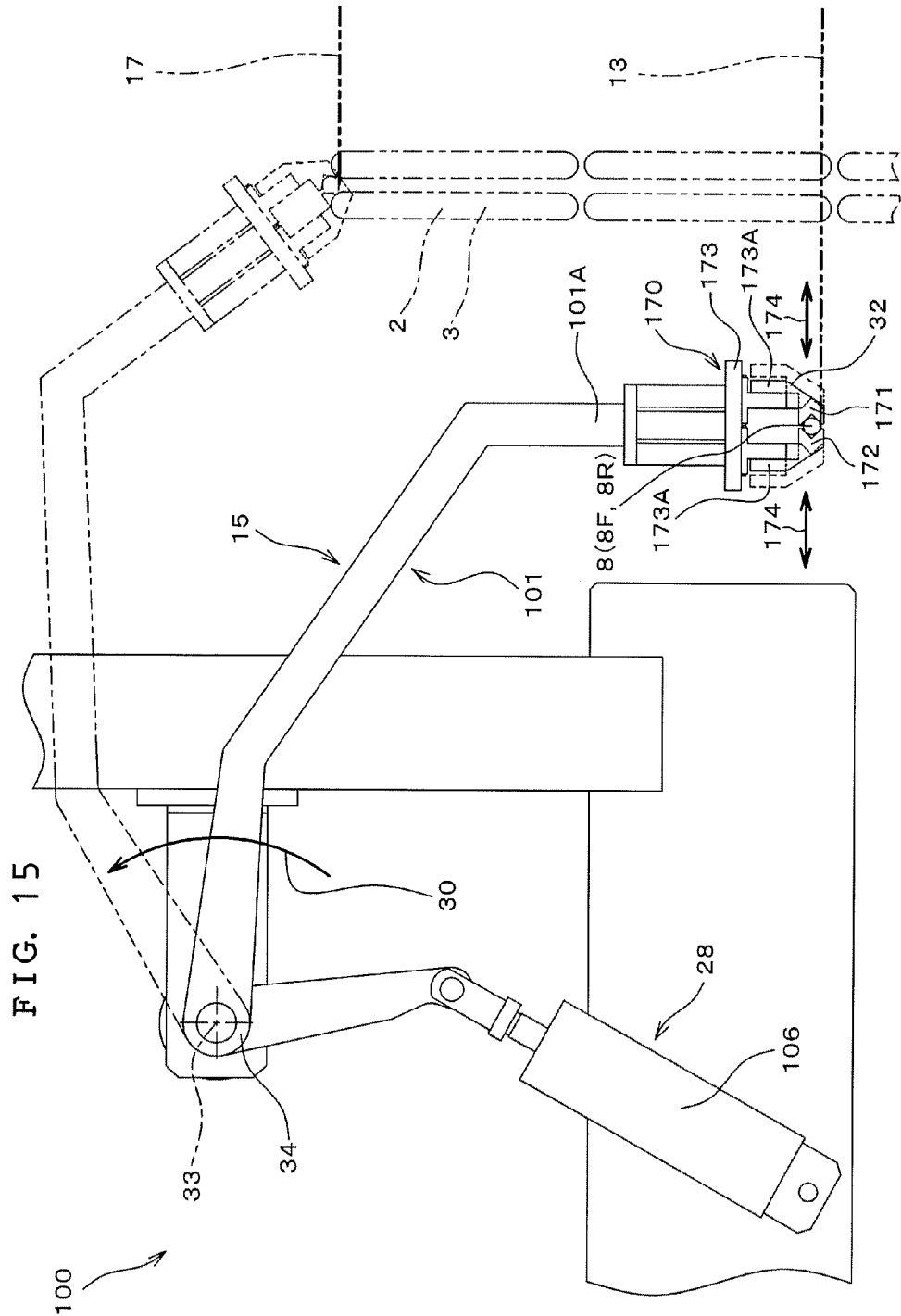
FIG. 15 is a diagram illustrating a modification of the second stick transferer.

The stick clamping means 170 shown in FIG. 15 is adapted to move the stick 8 on the first stick transferer 14 onto the second stick transferer 15 by clamping and holding the respective ones of the front portion 8F and the rear portion 8R of the stick 8 which has reached the upper position 13 while being held by the first stick transferer 14. Since the stick 8 is held by being clamped, the moving speed of the second stick transferer 15 can be speeded up.

The stick clamping means 170 has a clamping-member driving means, i.e., a known air actuator unit 173 in this example, for opening or closing right and left a pair of clamping members 171 and 172 for clamping the stick 8 from both sides of the stick 8, the air actuator unit 173 being mounted to a lower end portion 101A of the arm body 101. The air actuator unit 173 has a pair of movable members 173A which linearly reciprocate in directions of arrows 174, and the aforementioned clamping members 171 and 172 are secured to these movable members 173A. This clamping means 170 is applicable to the apparatus 1 as well.

Third Embodiment

Figure 16:
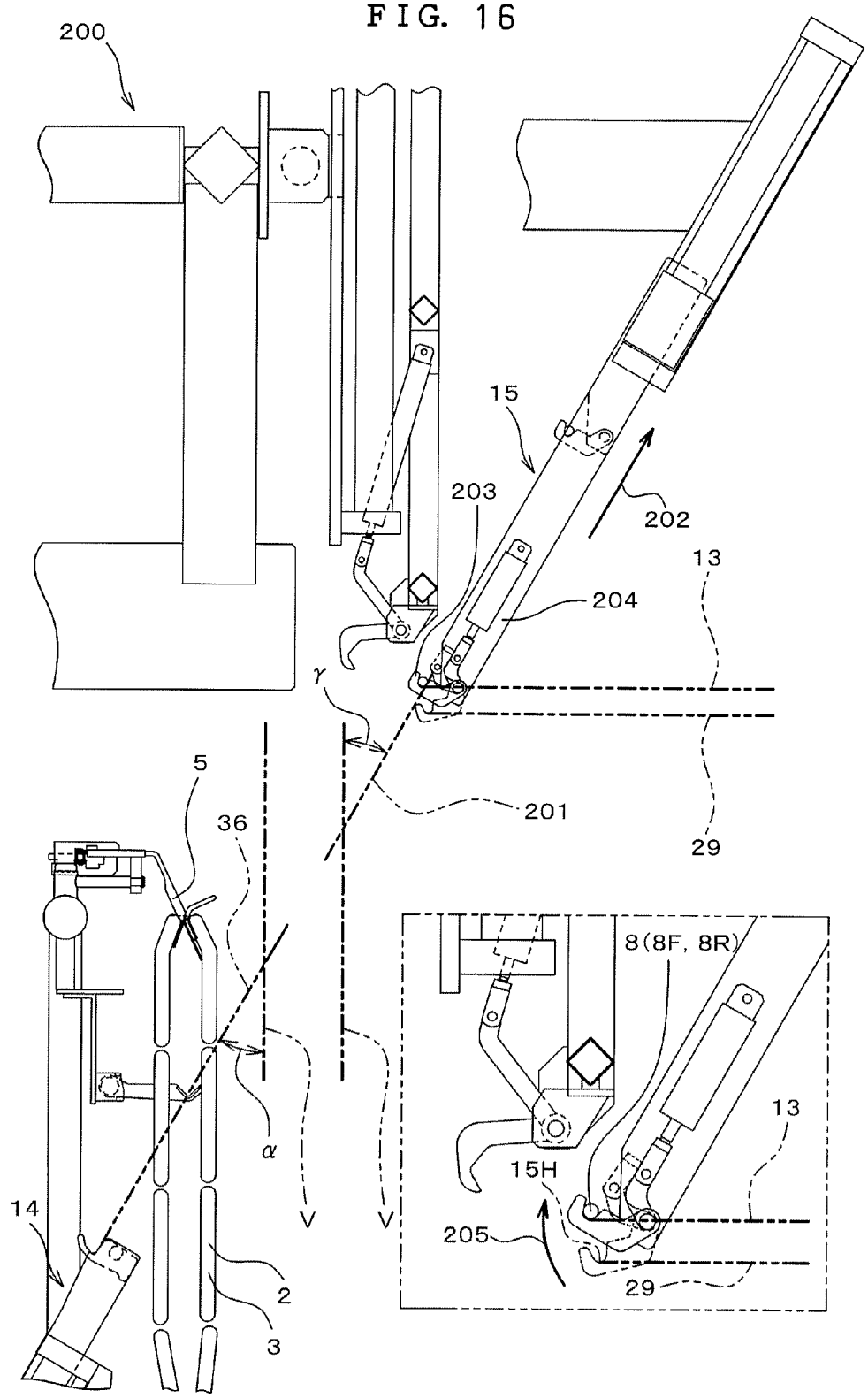
FIG. 16 is a diagram illustrating a third embodiment of the invention.

Next, an apparatus 200 in accordance with a third embodiment is shown in FIG. 16. The second stick transferer 15 of the apparatus 200 is adapted to reciprocatingly move on a rectilinear moving path 201 which is inclined downward toward the hooks 5 at an angle of inclination y. The second stick transferer 15 has the pair of stick holding portions 15H which are raised in the direction of arrow 202 from the starting point position 29 located downwardly of the upper position 13, abut from below against the front portion 8F and the rear portion 8R of the stick 8 at the upper position 13 to move the stick 8 from the first stick transferer 14 onto the second stick transferer 15, and hold the front portion 8F and the rear portion 8R of the moved stick 8.

A specific portion 203 of the second stick transferer 15 where the stick holding portion 15H is formed is mounted rotatably with respect to another portion 204. The arrangement provided is such that at the time when the stick 8 at the upper position 13 is moved onto the second stick transferer 15, the specific portion 203 is rotated in a direction of arrow 205 to take up the stick 8 by the stick holding portion 15H.

Since the angle of inclination y of the second stick transferer 15 is set to an angle which substantially conforms to the angle of inclination α of the first stick transferer 14, the change in the direction (direction of arrow 202) of movement of the stick 8 moved onto the second stick transferer 15 from the first stick transferer 14 is small, so that the holding of the stick 8 is stabilized.

The invention claimed is:

1. An apparatus for transferring a stick for suspending loops of sausages, comprising:
   stick supporting means for supporting the stick at a position located downwardly of suspending portions of hooks, each hook having a suspending portion for suspending the loop of the sausages;
   a first stick transferer which is raised from a lowermost position located downwardly of the stick supported by said stick supporting means to an upper position located upwardly of the hooks to raise the stick moved onto said first stick transferer from said stick supporting means, and the first stick transferer is subsequently lowered to the lowermost position; and
   a second stick transferer which is provided at a position upwardly distant from the hooks and which is raised to an uppermost position located upwardly of the upper position to raise the stick, which has been moved onto said second stick transferer from said first stick transferer, to the uppermost position, and the second stick transferer is subsequently lowered toward the upper position to lower the stick with the loops of the sausages suspended therefrom, wherein said second stick transferer includes an arm body having one portion provided with one of a holding portion and stick clamping means and another portion provided with a rotational center for reciprocally rotating the stick holding portion or the stick holding means in upward and downward directions.

2. An apparatus for transferring a stick for suspending loops of sausages, comprising:
   stick supporting means for supporting the stick at a position located downwardly of suspending portions of hooks, each hook having a suspending portion for suspending the loop of the sausages;
   a first stick transferer which is raised from a lowermost position located downwardly of the stick supported by said stick supporting means to an upper position located upwardly of the hooks to raise the stick moved onto said first stick transferer from said stick supporting means, and the first stick transferer is subsequently lowered to the lowermost position; and
   a second stick transferer which is provided at a position upwardly distant from the hooks and which is raised to an uppermost position located upwardly of the upper position to raise the stick, which has been moved onto said second stick transferer from said first stick transferer, to the uppermost position, and the second stick transferer is subsequently lowered toward the upper position to lower the stick with the loops of the sausages suspended therefrom, wherein said second stick transferer has an arm body in which a first arm body and a second arm body are connected,
   the second arm body has another portion provided with a rotational center for causing one portion provided on the first arm body and adapted to hold the stick to reciprocally rotate in a vertical direction, and
   a connecting member which rotatably connects the first arm body and the second arm body is provided between the one portion and the other portion.

3. The apparatus for transferring a stick for suspending loops of sausages according to claim 1 or 2, wherein said first stick transferer is disposed at a lower position distant from said second stick transferer, such that a front first stick transferer and a rear first stick transferer of said first stick transferer and a front second stick transferer and a rear second stick transferer of said second stick transferer are raised and lowered on a substantially vertical line with respect to a longitudinal axis of the stick.

4. The apparatus for transferring a stick for suspending loops of sausages according to claim 1 or 2, further comprising: first-stick-transferer driving means for reciprocatingly moving said first stick transferer between the lowermost position and the upper position, said first-stick-transferer driving means being disposed at a position downwardly distant from the hooks.

5. The apparatus for transferring a stick for suspending loops of sausages according to claim 1 or 2, wherein said first-stick-transferer driving means raises said first stick transferer to the upper position so as to raise the stick being held by said first stick transferer to the upper position located at a shorter distance from the suspending portion than a length of the loop suspended from the suspending portion of the hook.

6. The apparatus for transferring a stick for suspending loops of sausages according to claim 1 or 2, further comprising: second-stick-transferer driving means for raising said second stick transferer to the uppermost position and subsequently lowering said second stick transferer toward the upper position, said second-stick-transferer driving means being disposed at a position upwardly distant from the hooks.

7. The apparatus for transferring a stick for suspending loops of sausages according to claim 1 or 2, wherein said second stick transferer reciprocatingly moves on a rectilinear moving path having an angle of inclination which is inclined downward toward the hooks.

8. The apparatus for transferring a stick for suspending loops of sausages according to claim 1 or 2, further comprising: receiving means located between the uppermost position and the hooks and adapted to receive the stick by abutting against the stick during the lowering of said second stick transferer.

9. The apparatus for transferring a stick for suspending loops of sausages according to claim 1 or 2, further comprising: stick carrying-out means which is movable in a longitudinal direction of the stick, said stick carrying-out means being adapted to take up the stick on said second stick transferer when said second stick transfer is lowered to a position between the uppermost position and the hooks and carry out the stick in the longitudinal direction.

10. The apparatus for transferring a stick for suspending loops of sausages according to claim 1 or 2, wherein a distance between the suspending portion and a linking portion joining a first sausage link suspended from the suspending portion of the hook and a second sausage link is set to be shorter than a distance between the suspending portion and a stick supporting position downwardly distant from the suspending portion, and
   a position of abutment against the sausage link by the stick on a moving path of said first stick transferer is located downwardly of the linking portion.

* * * * *